(12) United States Patent
Lee et al.

(10) Patent No.: US 7,349,802 B2
(45) Date of Patent: Mar. 25, 2008

(54) APPARATUS AND METHOD FOR DETECTING VEHICLE LOCATION IN NAVIGATION SYSTEM

(75) Inventors: Han Sung Lee, Seoul (KR); Mun Ho Jung, Seoul (KR); Dong Hoon Yi, Seoul (KR); Moon Jeung Joe, Anyang (KR)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 10/897,466

(22) Filed: Jul. 21, 2004

(65) Prior Publication Data

US 2005/0021229 A1 Jan. 27, 2005
US 2005/0149261 A9 Jul. 7, 2005

(30) Foreign Application Priority Data

| Jul. 21, 2003 | (KR) | 10-2003-0049855 |
| Dec. 31, 2003 | (KR) | 10-2003-0101284 |
| Jan. 20, 2004 | (KR) | 10-2004-0004477 |
| Apr. 23, 2004 | (KR) | 10-2004-0028386 |
| Apr. 23, 2004 | (KR) | 10-2004-0028387 |

(51) Int. Cl.
*G01C 21/30* (2006.01)

(52) U.S. Cl. .................. 701/209; 701/200; 340/995.22

(58) Field of Classification Search ........ 701/200–202, 701/208–214, 23–28; 340/988, 995.22; 342/357.06
See application file for complete search history.

(56) References Cited

U.S. PATENT DOCUMENTS

| 5,334,986 A | | 8/1994 | Fernhout | |
| 5,646,857 A | * | 7/1997 | McBurney et al. | ......... 701/213 |
| 5,862,511 A | * | 1/1999 | Croyle et al. | ............... 701/213 |
| 6,055,477 A | * | 4/2000 | McBurney et al. | ......... 701/207 |
| 2006/0025921 A1 | * | 2/2006 | Jung et al. | .................. 701/201 |

FOREIGN PATENT DOCUMENTS

| JP | 10185593 | 7/1998 |
| KR | 1996-0012100 | 4/1996 |
| KR | 1996-0038355 | 11/1996 |
| KR | 2002-0080829 | 10/2002 |

\* cited by examiner

*Primary Examiner*—Yonel Beaulieu
(74) *Attorney, Agent, or Firm*—Lee, Hong, Degerman, Kang & Schmadeka

(57) ABSTRACT

An apparatus and a method for detecting a vehicle location in a navigation system are provided. A travel angle difference and lateral and longitudinal inclinations of the vehicle are used to accurately detect the vehicle location if a vehicle location is estimated using detection signals from a sensor unit installed on a vehicle. If a value of DOP (Dilution of Positioning) of a navigation message received by a GPS (Global Positioning System) receiver is equal to or greater than a predetermined threshold, reference vehicle location information is set using vehicle location information just previously map-matched and the detection signals from the sensor unit. The vehicle location is detected using the set reference vehicle location information and the detection signals from the sensor unit.

31 Claims, 15 Drawing Sheets

APPARATUS AND METHOD FOR DETECTING VEHICLE LOCATION IN NAVIGATION SYSTEM

CROSS-REFERENCE TO RELATED APPLICATIONS

Pursuant to 35 U.S.C. §119(a), this application claims the benefit of earlier filing date and right of priority to Korean Patent Application Nos. 10-2003-49855, 10-2003-101284, 10-2004-4477, 10-2004-28386 and 28387, filed on Jul. 21, 2003, Dec. 31, 2003, Jan. 20, 2004, Apr. 23, 2004 and Apr. 23, 2004 respectively, the contents of which are hereby incorporated by reference herein in their entirety.

BACKGROUND OF THE INVENTION

1. Field of the Invention

The present invention relates to an apparatus and method for detecting a vehicle location in a navigation system, wherein a vehicle location can be precisely estimated using detection signals from sensors installed at a vehicle and then map-matched on a digital map so as to be displayed on a display screen.

2. Description of the Related Art

As the number of vehicles such as cars continuously increases, traffic congestion becomes more critical. Particularly, there is a serious problem in that the rate of increase in the number of vehicles is much higher than the rate at which roads and other infrastructures are being expanded. One recent study found that, in the major urban areas of the United States, the total cost of traffic congestion exceeds $47.5 billion per year. Traffic congestion wastes more than 14.35 billion liters of fuel and 2.7 billion hours of work time per year. These numbers have continued to increase by 5% to 10% per year through the 1990s.

As one of solutions to such traffic congestion, attention has been paid to a navigation system for guiding a travel path of a vehicle using a global positioning system (GPS). GPS is a satellite-based navigation system developed by the U.S. Department of Defense, wherein a plurality of GPS satellites arranged on geostationary orbits over the Earth transmit navigation messages, respectively, and a GPS receiver receives navigation messages transmitted by at least four GPS satellites among the navigation messages transmitted by the plurality of GPS satellites, so as to detect the distance between the GPS satellites and the GPS receiver and position vectors of the GPS satellites using the received navigation messages and to calculate a position vector of the GPS receiver. That is, it is possible to precisely detect 3D coordinates of the receiver that receives the navigation messages from the GPS satellites anywhere over the world.

In a navigation system using GPS, a GPS receiver receives navigation messages transmitted by a plurality of GPS satellites so as to detect a location at which the navigation messages are received, i.e. a vehicle location, using the received navigation messages, and the detected vehicle location is map-matched on a digital map so that the digital map and the vehicle location can be displayed on a display screen.

Therefore, a vehicle user can check a current vehicle location, a shortest path from the current location to a destination, and the like using the navigation system. Further, under the guidance of the navigation system, the vehicle user can beforehand plan a travel path along which a vehicle travels and be guided so that he/she moves the vehicle along the planned travel path, resulting in efficient use of road systems.

However, the navigation system can precisely detect a vehicle location only at an area where the GPS receiver can correctly receive the navigation messages transmitted by the GPS satellites. That is, since GPS detects a vehicle location using the GPS receiver that receives the navigation messages transmitted by the GPS satellites, it may not detect coordinates of a vehicle location or merely can obtain very incorrect results of detection of the coordinates at areas, including the interiors of tunnels, thickly-wooded forests or downtown areas surrounded by skyscrapers, where the GPS receiver cannot correctly receive the navigation messages transmitted by the GPS satellites.

Thus, a deduced reckoning system for deducing a vehicle location by detecting the travel distance and direction of a vehicle has been employed at areas where a vehicle location cannot be calculated since a GPS receiver cannot correctly receive navigation messages from GPS satellites.

The deduced reckoning system continues to measure the travel distance and direction of the vehicle from its initial location by using sensors including an odometer for detecting the number of revolutions of a driving wheel of the vehicle, and a gyroscope for detecting a travel angle difference of the vehicle. The vehicle location is consecutively estimated from the distance traveled and the travel direction by continuously integrating the number of revolutions of the driving wheel and the travel angle difference that have been measured. Since such a deduced reckoning system should initially know the coordinates of a reference location of the vehicle, it is also called "dead-reckoning."

However, the deduced reckoning system has disadvantages in that the initial location of the vehicle should be set correctly, and an estimated location of the vehicle is incorrect due to an accumulation of measurement errors inherent to the sensors if the vehicle travels for a long time during a process of deducing the vehicle location using the deduced reckoning system.

To solve these problems, there has been developed a hybrid navigation system. The hybrid navigation system comprises a GPS receiver for receiving a navigation message, and sensors installed on a vehicle, such as a gyroscope and an odometer for detecting the travel angle difference and traveled distance of the vehicle. If the value of dilution of precision (DOP) of the navigation message received by the GPS receiver is less than a predetermined threshold, a vehicle location is detected based on the received navigation message and the detection signals from the sensors. If the value of dilution of precision (DOP) of the navigation message received by the GPS receiver is equal to or greater than the predetermined threshold, the vehicle location is detected by using only the detection signals from the sensors without using the received navigation message.

When the GPS receiver detects a vehicle location by receiving navigation messages transmitted by a plurality of GPS satellites, DOP as a geometrical error is produced according to the relationship of arrangement between the GPS satellites, which have transmitted the navigation messages received by the GPS receiver, with respect to the position of the GPS receiver. The value of DOP becomes small if the GPS satellites are arranged uniformly with respect to the position of the GPS receiver, but large if the GPS satellites are not arranged uniformly. The GPS receiver detects the value of DOP according to the relationship of arrangement between the relevant GPS satellites from which the GPS receiver receives the navigation messages. If the value of DOP according to the relationship of arrangement between the relevant GPS satellites from which the GPS receiver receives the navigation messages is less than 2, this is an excellent case. If the value of DOP ranges from 2 to 3, this is a good case. If the value of DOP ranges from 4 to 5, this is a regular case. If the value of DOP is equal to or greater than 6, this cannot be utilized due to many errors in the position of the GPS receiver detected from the received navigation messages.

The hybrid navigation system determines based on the value of DOP whether the navigation messages received by the GPS receiver are used. If the value of DOP is less than a predetermined threshold, e.g., 5, the vehicle location is detected using both the received navigation messages and the detection signals from the sensors installed on the vehicle. If the value of DOP is equal to or greater than 5, the vehicle location is detected using only the detection signals from the sensors without using the received navigation messages.

However, in the case where the hybrid navigation system detects a current vehicle location using only the detection signals from the sensors since the value of DOP of a navigation message received by the GPS receiver is equal to or greater than the predetermined threshold, the detection of the current vehicle location is iterated using a vehicle location, which has been detected using just previous detection signals from the sensors, as a reference location. Thus, errors in the vehicle location detected using the detection signals from the sensors are continuously accumulated. Accordingly, there is a problem in that the difference between an actual vehicle location and a vehicle location detected using the detection signals from the sensors increases continuously with time.

That is, on the assumption that a vehicle travels along links between nodes L1, L2 and L3 as shown in FIG. 1, vehicle locations P1 and P2 are precisely detected using navigation messages with the values of DOP less than a predetermined threshold received by a GPS receiver, and vehicle locations are then detected using only detection signals from sensors installed on the vehicle after the values of DOP of received navigation messages become equal to or greater than the threshold, location P2 is detected and current vehicle location P3 is then detected using the detection signals from the sensors with respect to location P2. Thereafter, current vehicle location P4 is detected with respect to vehicle location P3 that has been detected just previously. Iteration of such processes results in detection of locations P5, P6, P7, P8 and P9.

However, the detection of a vehicle location using only the detection signals from the sensors, i.e. a travel angle difference and traveled distance, contains a little error in the detected vehicle location in view of characteristics of the sensors. Such a prior art has a problem in that since a current vehicle location is detected with respect to a just previously detected vehicle location, errors in vehicle locations detected using the detection signals from the sensors are continuously accumulated and thus the difference between an actual vehicle location and a detected vehicle location increases with time.

Further, when the traveled distance of the vehicle is estimated from the detection signals from the sensors in the prior art, the distance traveled per unit time is estimated by multiplying the number of pulse signals, which are generated from an odometer depending on a travel of the vehicle irrespective of a travel speed of the vehicle, by a predetermined distance conversion coefficient. Thus, there is a large difference between an actual vehicle location and a detected vehicle location according to the travel speed of the vehicle.

That is, when the vehicle travels, different frictional forces are produced between driving wheels and a road according to the travel speed of the vehicle. Due to this phenomenon, even though the vehicle travels by an identical distance, the number of pulse signals generated by the odometer varies according to the travel speed of the vehicle.

However, since the traveled distance of the vehicle is estimated by multiplying the number of pulse signals, which are generated from the odometer, by only the predetermined distance conversion coefficient in the prior art, a large difference occurs between an actual vehicle location and a detected vehicle location according to the travel speed of the vehicle.

Further, the travel angle difference of the vehicle detected by an output signal from the gyroscope cannot correctly reflect a 3D gradient of a road on which the vehicle travels. Moreover, the traveled distance of the vehicle detected by the odometer cannot also reflect a fore-and-aft gradient of a road on which the vehicle travels. These become causes of the occurrence of errors in the determination of a vehicle location, resulting in a large difference between the traveled distance and a traveled distance on a plane of an actual map.

Although there has been proposed a method using a cumulative inclinometer to reduce such errors, measurement errors are continuously accumulated in the cumulative inclinometer. Thus, an estimated vehicle location becomes incorrect with time. Further, at a junction of an overpass and a surface street, what road a vehicle enters or exits from cannot be correctly determined. Therefore, there is a problem in that errors occur in performing map-matching of a vehicle location on a digital map.

SUMMARY OF THE INVENTION

Accordingly, a first object of the present invention is to provide an apparatus and method for detecting a vehicle location in a navigation system, wherein the vehicle location can be precisely detected in such a manner that an error included in a detected vehicle location will not be accumulated on the next detected vehicle location in a case where the value of DOP of a navigation message received from a GPS satellite is equal to or greater than a predetermined threshold and thus the vehicle location is detected using only detection signals from sensors installed on a vehicle.

A second object of the present invention is to provide a method of detecting a vehicle location in a navigation system, wherein the vehicle location can be precisely detected irrespective of a moving speed of a vehicle by differently setting a traveled-distance conversion coefficient according to the moving speed of the vehicle in a case where the vehicle location is estimated using detection signals from sensors.

A third object of the present invention is to provide a method of detecting a vehicle location in a navigation system, wherein the vehicle location can be precisely detected by installing a biaxial inclinometer on a vehicle, detecting a lateral inclination in a right and left direction and a longitudinal inclination in a fore and aft direction with respect to a travel direction of a vehicle, and correcting a traveled distance and a travel angle difference of the vehicle based on the detected lateral and longitudinal inclinations.

A fourth object of the present invention is to provide a method of detecting a vehicle location in a navigation system, wherein the vehicle location can be precisely detected by positively utilizing the azimuth of a road on which a vehicle travels.

A fifth object of the present invention is to provide a method of detecting a vehicle location in a navigation system, wherein the vehicle location can be precisely estimated using a gradient of a road on which a vehicle travels at a junction of an overpass and a surface street.

In an apparatus for detecting a vehicle location in a navigation system for achieving the first object, a GPS receiver receives a navigation message transmitted by a GPS satellite, a map data storage unit stores in advance a digital map data therein, and a sensor unit detects a travel angle difference and a traveled distance of a vehicle and lateral and longitudinal inclinations of a road on which the vehicle travels. A control unit of the apparatus compares the value of DOP of the navigation message received by the GPS receiver with a predetermined threshold. If the value of DOP is less than the predetermined threshold, the control unit sets reference vehicle location information from vehicle location information detected using the navigation message. If the value of DOP is equal to or greater than the predetermined threshold, the control unit determines the reference vehicle location information by storing vehicle location information map-matched to the digital map data when the just previous value of DOP was less than the predetermined threshold, by accumulating detection signals from the sensor unit, and by using the stored vehicle location information and the accumulated detection signals from the sensor unit. The control unit estimates the vehicle location using the determined reference vehicle location information and the detection signals from the sensor unit, map-matches the estimated vehicle location to the digital map data stored in the map data storage unit, and outputs the map-matched results to display the map-matched digital map data and vehicle location on a screen of a display unit.

In the control unit, a map-matched result extraction section extracts the vehicle location information according to results of the map-matching of the vehicle location to the digital map data, and also extracts a status code for notifying whether the extracted vehicle location information is location information determined using the navigation message. A location information extraction section extracts the vehicle location information and the DOP using the navigation message received by the GPS receiver. A travel information extraction section extracts vehicle travel information using the detection signals from the sensor unit. According to the extracted value of DOP, a reference location information determination section determines the reference vehicle location information using the vehicle location information extracted by the location information extraction section, or determines the reference vehicle location information using the vehicle location information extracted by the map-matched result extraction section and the detection signals from the sensor unit, and generates a status code for notifying whether the determined reference vehicle location information has been determined using the navigation message. A dead reckoning section detects current vehicle location information by performing dead-reckoning using the reference vehicle location information determined by the reference location information determination section and the vehicle travel information extracted by the travel information extraction section. A map-matching section map-matches the vehicle location information detected by the dead reckoning section to the digital map data stored in the map data storage unit, outputting the map-matched results to the display unit, and providing information on the map-matched results to the map-matched result extraction section to extract the vehicle location information according to the map-matching.

A method of detecting a vehicle location in a navigation system for achieving the first object comprises the steps of: extracting, by a map-matched result extraction section, vehicle location information by receiving vehicle location information map-matched to digital map data from a map-matching section, extracting, by a location information extraction section, vehicle location information and DOP using a navigation message received by a GPS receiver, and extracting, by a travel information extraction section, vehicle travel information using detection signals from a sensor unit installed on a vehicle; determining the vehicle location information extracted by the location information extraction section as reference vehicle location information, or determining the reference vehicle location information using the vehicle location information extracted by the map-matched result extraction section and the detection signals from the sensor unit, according to the extracted value of DOP; performing, by a dead reckoning section, dead reckoning using the extracted vehicle travel information and the determined reference vehicle location information to extract current vehicle location information; and map-matching, by the map-matching section, the extracted current vehicle location information to the digital map data, displaying the map-matched results on a display unit, and providing the map-matched results to the map-matched result extraction section.

The step of determining the reference vehicle location information comprises the steps of: comparing the value of DOP with a predetermined threshold; if it is determined from the comparison that the value of DOP is less than the predetermined threshold, determining the vehicle location information extracted by the location information extraction section as the reference vehicle location information; and if it is determined from the comparison that the value of DOP is equal to or greater than the predetermined threshold, storing the vehicle location information extracted by the map-matched result extraction section at an initial stage where the value of DOP becomes equal to or greater than the predetermined threshold, accumulating the detection signals from the sensor unit, and determining the reference vehicle location information using the stored vehicle location information and the accumulated detection signals from the sensor unit.

A method of determining a vehicle location in a navigation system for achieving the second object comprises the steps of: determining a travel speed of a vehicle using the number of pulse signals per unit time generated by an odometer of a sensor unit according to travel of the vehicle; determining a traveled-distance conversion coefficient varying according to the determined travel speed of the vehicle, and calculating a traveled distance per unit time of the vehicle.

The step of determining the traveled-distance conversion coefficient comprises the steps of: determining whether the travel speed of the vehicle is not equal to or greater than a predetermined speed; if it is determined that the travel speed of the vehicle is not equal to or greater than a predetermined speed, determining a predetermined constant as the traveled-distance conversion coefficient; and if it is determined that the travel speed of the vehicle is equal to or greater than the predetermined speed, determining the traveled-distance conversion coefficient through calculation using a predetermined logarithmic function including the number of pulse signals per unit time generated by the odometer.

A method of detecting a vehicle location in a navigation system for achieving the third object comprises the steps of: receiving a travel angle difference and a traveled distance of a vehicle, and lateral and longitudinal inclinations of a road on which the vehicle travels from a sensor unit; calculating a traveled distance per unit time using the received traveled distance; correcting the travel angle difference and the traveled distance per unit time of the vehicle using the received lateral and longitudinal inclinations of the road; and determining a current vehicle location from a previous vehicle location using the corrected angle difference and the traveled distance per unit time.

A method of detecting a vehicle location in a navigation system for achieving the fourth object comprises the steps of: extracting, by a control unit, an azimuth of a road on which a vehicle currently travels from a digital map, and extracting a traveled distance per unit time of the vehicle using the number of pulse signals output from an odometer of a sensor unit according to travel of the vehicle; estimating current longitude and latitude coordinates of the vehicle using the extracted azimuth of the road, the extracted traveled distance per unit time of the vehicle, and just previously estimated longitude and latitude coordinates of the vehicle; determining a location and a road where the vehicle will be matched on the digital map using the extracted azimuth of the road and the estimated longitude and latitude coordinates of the vehicle; and matching the vehicle at the determined location and road and displaying the matched results.

A method of detecting a vehicle location in a navigation system for achieving the fifth object comprises the steps of: acquiring, by a control unit, a current vehicle location using hybrid navigation; acquiring an inclination of a road on which a vehicle travels using detection signals from a sensor unit; searching roads within a search radius set from the acquired current vehicle location using digital map data, extracting roads on which the vehicle location will be matched, and searching attributes of the extracted roads; if it is determined from the search results of the road attributes that there is no entrance link for an overpass, the current vehicle location is matched on a road closest thereto; if there is an entrance link for an overpass, comparing the acquired inclination of the road on which the vehicle currently travels with an inclination of a previous road on which the vehicle has traveled; if it is determined from the comparison that the inclination of the current road is larger than that of the previous road, matching the vehicle location on an overpass; and if the inclination of the current road is not larger than that of the previous road, matching the vehicle location on a closest road among roads except overpasses.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, a method of detecting a vehicle location in a navigation system according to the present invention will be described in detail with reference to accompanying drawings.

Figure 1:
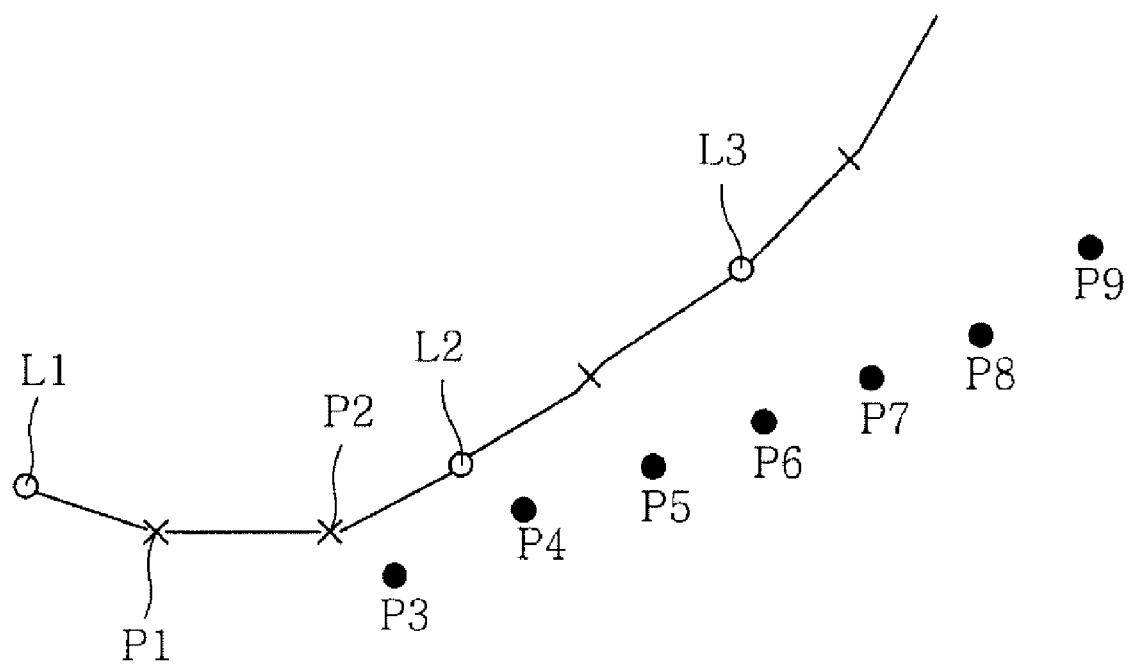
FIG. 1 is a diagram illustrating an accumulation of errors in vehicle locations estimated on the basis of detection signals from sensors in a conventional hybrid navigation system.
Figure 2:
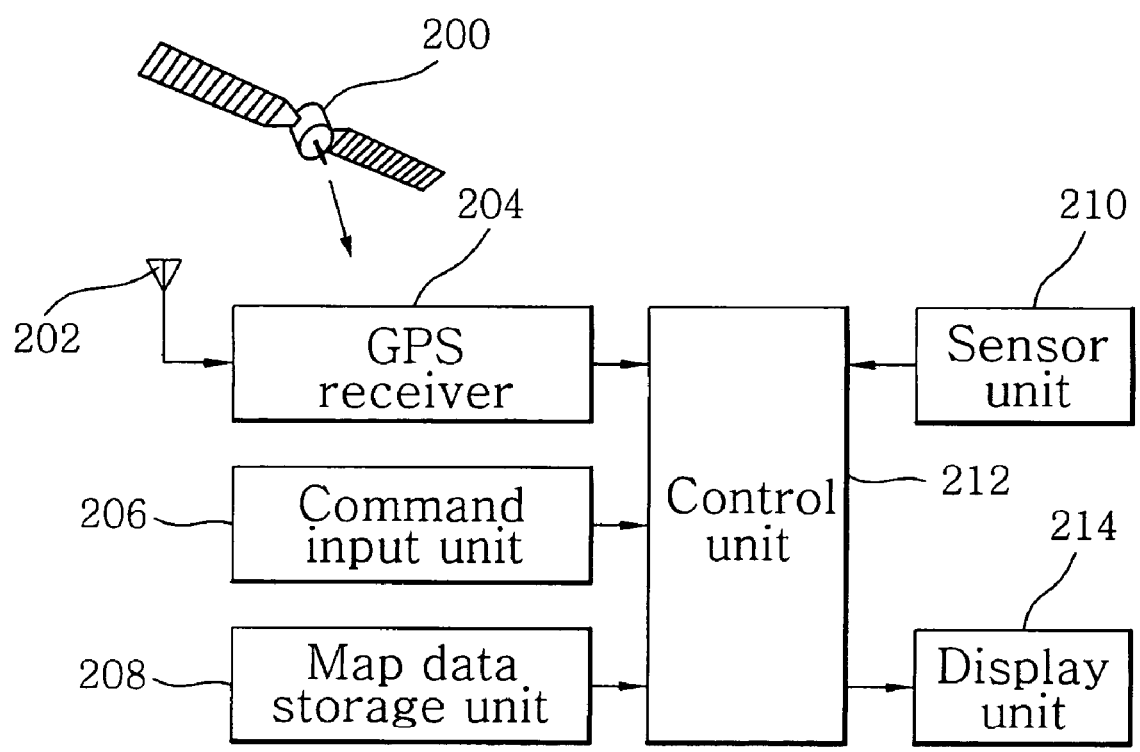
FIG. 2 is a block diagram showing a configuration of a detection apparatus of the present invention.

FIG. 2 is a block diagram showing a configuration of an apparatus for detecting a vehicle location according to the present invention. As shown in the figure, the apparatus comprises a GPS receiver 204 for receiving a navigation message, which has been transmitted by a GPS satellite 200, through an antenna 202; a command input unit 206 for inputting an operation command corresponding to a user's manipulation; a map data storage unit 208 for storing a digital map data therein; a sensor unit 210, including a gyroscope, an odometer, a biaxial inclinometer for detecting lateral and longitudinal inclinations of a vehicle, and the like installed on a vehicle, to detect a travel angle difference, a traveled distance, and lateral and longitudinal inclinations of the vehicle; a control unit 212 for controlling detection of the value of DOP of the navigation message received by the GPS receiver 204, detection of the vehicle location using the navigation message received by the GPS receiver 204 and detection signals from the sensor unit 210 if the detected value of DOP is less than a predetermined threshold or using the detection signals from the sensor unit 210 if the value of DOP is equal to or greater than the predetermined threshold, map-matching of the detected vehicle location to digital map data stored in the map data storage unit 208, and displaying of the map-matched digital map data and vehicle location; and a display unit 214 for displaying the digital map data and vehicle location on a screen thereof under the control of the control unit 212.

Figure 3:
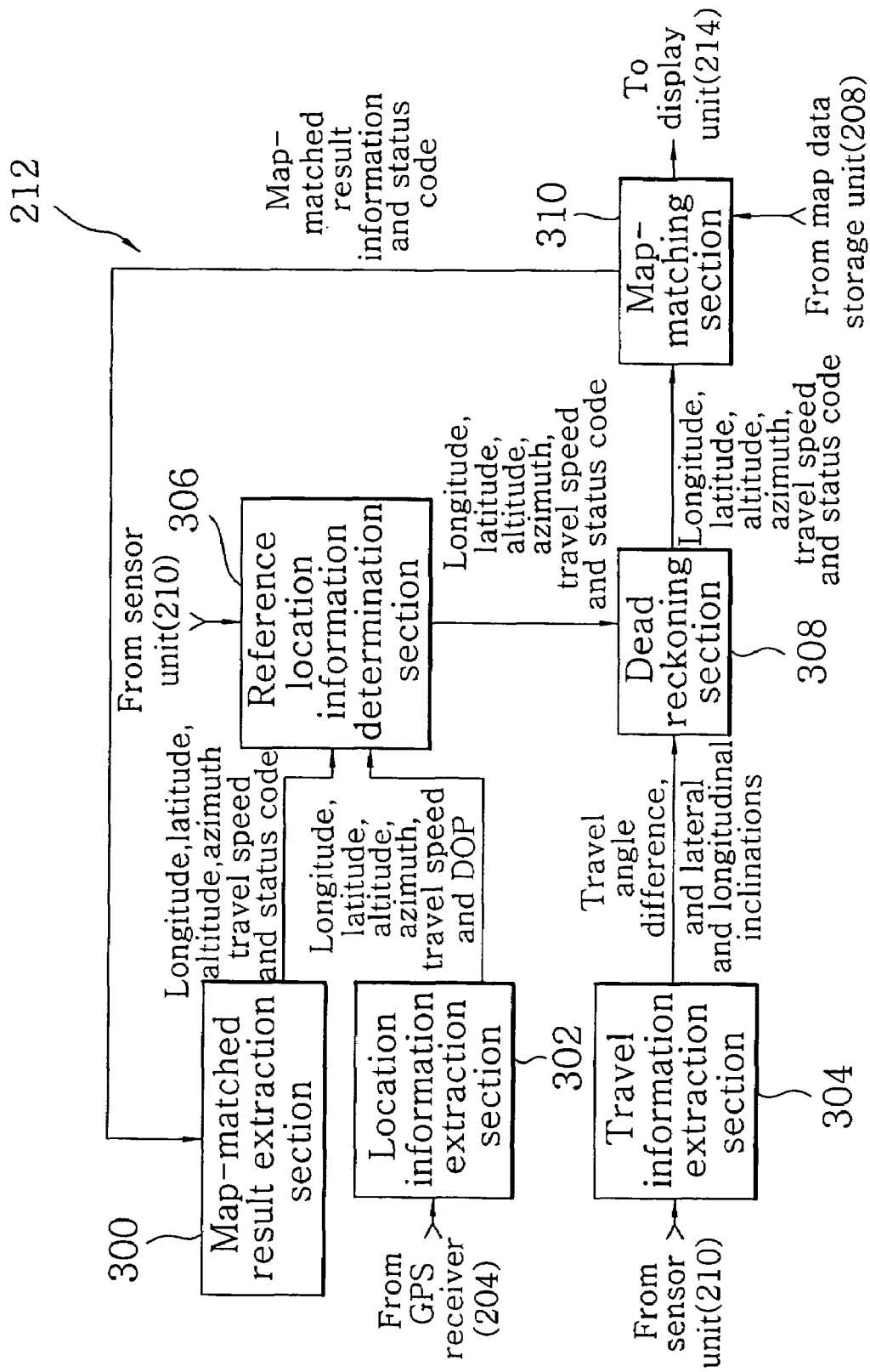
FIG. 3 is a block diagram showing an inner configuration of a control unit of FIG. 2.

As shown in FIG. 3, the control unit 212 comprises a map-matched result extraction section 300 for extracting vehicle location information from information on results of the map-matching of the vehicle location to the digital map data, and extracting a status code for notifying whether the extracted vehicle location information is location information determined using the navigation message; a location information extraction section 302 for extracting the vehicle location information and the DOP using the navigation message received by the GPS receiver 204; a travel information extraction section 304 for extracting vehicle travel information using the detection signals from the sensor unit 210; a reference location information determination section 306 for determining, according to the value of DOP extracted by the location information extraction section 302, a reference vehicle location information using the vehicle location information extracted by the location information extraction section 302 or using the vehicle location information extracted by the map-matched result extraction section 300 and the detection signals from the sensor unit 210, and for generating a status code for notifying whether the determined reference location information is determined using the navigation message; a dead reckoning section 308 for detecting current vehicle location information by performing dead-reckoning using the reference vehicle location information determined by the reference location information determination section 306 and the vehicle travel information extracted by the travel information extraction section 304; and a map-matching section 310 for map-matching the vehicle location information detected by the dead reckoning section 308 to the digital map data stored in the map data storage unit 208, outputting the map-matched results to the display unit 214, and providing information on the map-matched results to the map-matched result extraction section 300 to extract the vehicle location information according to the map-matching.

The vehicle location detection apparatus of the present invention constructed as above receives the navigation message, which has been transmitted by the GPS satellite 200, through the antenna 202, and outputs the received navigation message to the location information extraction section 302 of the control unit 212.

As the vehicle travels, the sensor unit 210 detects the vehicle travel information, i.e. the travel angle difference, traveled distance, and lateral and longitudinal inclinations of the vehicle, and outputs the detected vehicle travel information to the travel information extraction section 304 of the control unit 212.

Then, the location information extraction section 302 extracts the longitude, latitude, altitude, azimuth and travel speed of the vehicle and the value of DOP using the navigation message received by the GPS receiver 204. The travel information extraction section 304 extracts the travel angle difference, traveled distance, and lateral and longitudinal inclinations of the vehicle using the detection signals from the sensor unit 210.

Meanwhile, the map-matched result extraction section 300 receives the information on the results of the map-matching of the vehicle location to the digital map data from the map-matching section 310, and extracts the location information, such as the longitude, latitude, altitude, azimuth and speed obtained through the map-matching of the vehicle location to the digital map data, and the status code.

In such a state, the reference location information determination section 306 determines whether the value of DOP extracted by the location information extraction section 302 is less than, or equal to or greater than the predetermined threshold. If it is determined that the value of DOP is less than the predetermined threshold, the reference location information such as the longitude, latitude, altitude, azimuth and speed of the vehicle is determined using the vehicle location information extracted by the location information extraction section 302. Further, an output signal of the location information extraction section 302, i.e. the status code for notifying that the reference location information has been determined using the navigation message, is generated. If it is determined that the value of DOP is equal to or greater than the predetermined threshold, the status code extracted by the map-matched result extraction section 300 is determined.

If it is determined from the status code that the reference location information is determined using a just previous navigation message, the location information extracted by the map-matched result extraction section 304 is stored, the vehicle location information is estimated using the stored reference location information and the detection signals from the sensor unit and then determined as the reference location information, and a status code for notifying that the reference location information has not been determined using the navigation message is generated.

If it is determined from the status code that reference location information determined just previously was not determined using a navigation message, the reference location information determination section 306 estimates current vehicle location information using the stored location information, i.e. location information extracted and stored by the map-matched result extraction section 304 at an initial stage where the value of DOP is equal to or greater than the predetermined threshold, and a cumulative detection signal obtained through accumulation of the detection signals from the sensor unit 210. The reference location information determination section 306 determines the estimated vehicle location information as the reference location information, and then consecutively generates the status code for notifying that the reference location information has not been determined using the navigation message.

When the reference location information on the vehicle is determined in such a manner, the dead reckoning section 308 performs dead reckoning using the determined reference location information and the vehicle travel information extracted by the travel information extraction section 304, i.e. the travel angle difference, traveled distance, and lateral and longitudinal inclinations of the vehicle, so as to detect a current vehicle location. The map-matching section 310 map-matches the detected vehicle location to the digital map data stored in the map data storage unit 208 and causes the map-matched results to be displayed on the display unit 214 by outputting them thereto. Further, the map-matched results are provided to the map-matched result extraction section 300 in order to extract vehicle location information according to the map-matched results.

Figure 4:
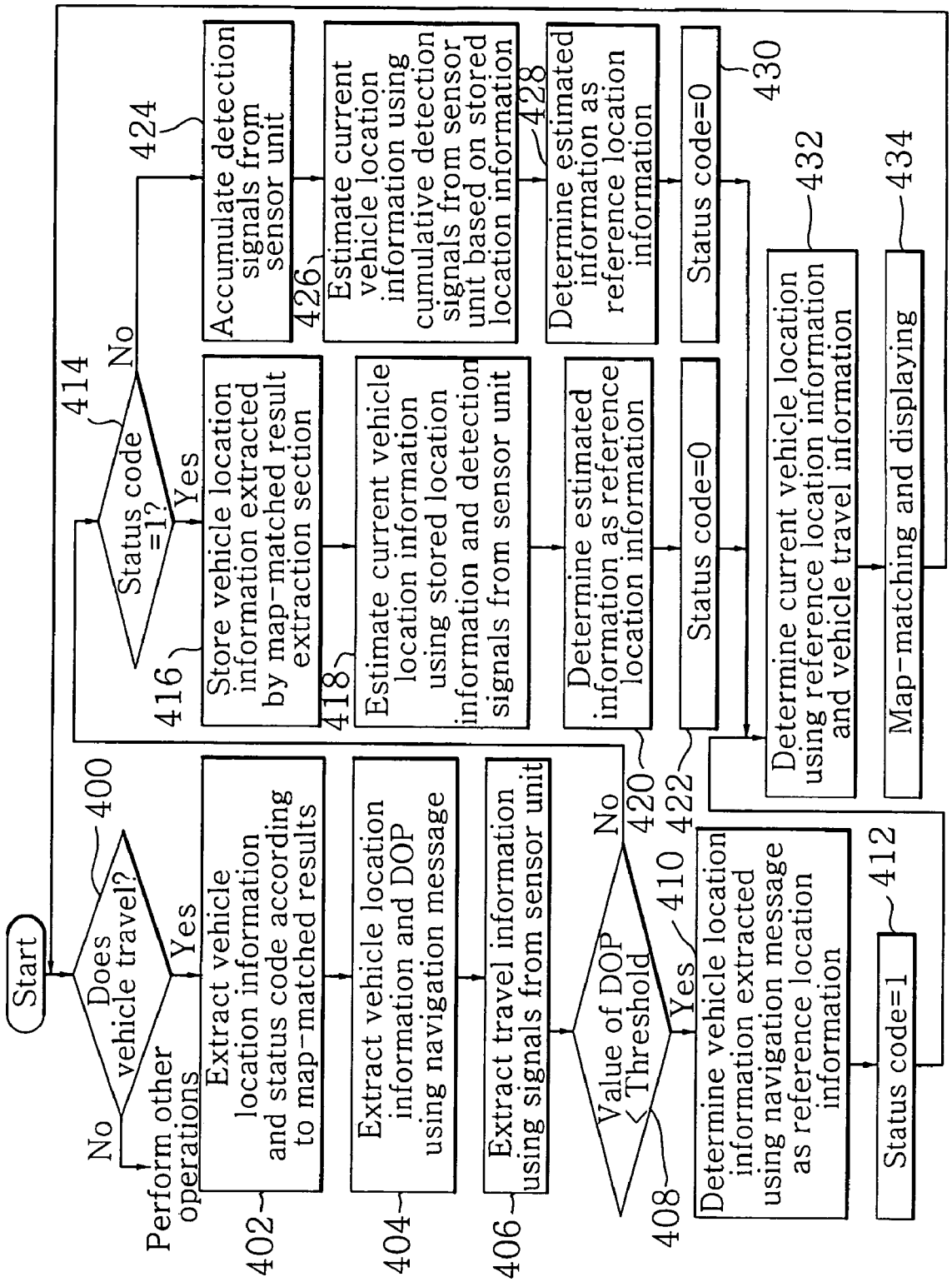
FIG. 4 is a flowchart illustrating a detection method of the present invention.

In the meantime, FIG. 4 is a flowchart illustrating a method of detecting a vehicle location according to the present invention. As shown in the figure, the control unit 212 determines whether a vehicle travels (step 400). If the vehicle travels, the map-matched result extraction section 300 of the control unit 212 extracts vehicle location information map-matched to digital map data using information on map-matched results of the map-matching section 310 (step 402). That is, the longitude, latitude, altitude, azimuth and speed of the vehicle and a status code are extracted.

The location information extraction section 302 of the control unit 212 extracts location information, such as the longitude, latitude, altitude, azimuth and speed of the vehicle, and DOP using a navigation message received by the GPS receiver 204 (step 404). The travel information extraction section 304 extracts the travel angle difference, traveled distance, and lateral and longitudinal inclinations of the vehicle using the detection signals from the sensor unit 210 (step 406).

When the vehicle location information obtained using the map-matched results, the vehicle location information obtained using the received navigation message, and the vehicle travel information obtained using the detection signals from the sensor unit 210 are extracted, the reference location information determination section 305 of the control unit 212 compares the value of DOP extracted by the location information extraction section 302 with a predetermined threshold (step 408). If it is determined from the comparison in step 408 that the value of DOP is less than the predetermined threshold, the reference location information determination section 305 determines the location information extracted by the location information extraction section 302, i.e. the location information extracted using the received navigation message, as the reference location information (step 410). Then, the reference location information determination section 305 generates a status code for notifying that the location information extracted using the navigation message has been determined as the reference location information (step 412).

Here, assume that the value of the status code becomes 1 if an output signal of the location information extraction section 302 using the navigation message is determined as the reference location information, whereas it becomes 0 if the reference location information is not determined using the navigation message.

If it is determined in step 408 that the value of DOP is equal to or greater than the threshold, the reference location information determination section 305 of the control unit 212 determines the value of the status code output from the map-matched result extraction section 300 (step 414).

If it is determined in step 414 that the value of the status code is '1' and the reference location information has been determined using location information extracted using a just previous navigation message, the reference location information determination section 306 stores the vehicle location information extracted by the map-matched result extraction section 300, i.e. previous location information on map-matching of the vehicle location to the digital map data (step 416). Then, the reference location information determination section 306 estimates current vehicle location information using the stored location information and the detection signals from the sensor unit 210 (step 418), and generates a status code for notifying that the location information extracted using the navigation message has not been determined as the reference location information (step 422).

Meanwhile, if it is determined in step 414 that the value of the status code is '0', i.e. the reference location information has not been determined using the location information extracted from the just previous navigation message, the reference location information determination section 305 accumulates the detection signals from the sensor unit 210 (step 424), estimates current vehicle location information using the cumulative detection signals from the sensor unit 210 based on the stored location information (step 426), determines the estimated location information as the reference location information (step 428), and consecutively generates the status code for notifying that the location information extracted using the navigation message has not been determined as the reference location information (step 430).

When the reference location information is determined in such a manner, the dead reckoning section 308 performs dead reckoning using the determined reference location information and the vehicle travel information extracted by the travel information extraction section 304 and thus determines a current vehicle location (step 432). The map-matching section 310 performs map-matching of the determined current vehicle location to the digital map stored in the map data storage unit 208 and outputs the map-matched results to the display unit 214 to be displayed thereon (step 434). Then, the procedure returns to step 400 in which determination is made as to whether the vehicle travels. If the vehicle travels, the aforementioned procedure is repeated to continuously detect and display vehicle locations.

Figure 5:
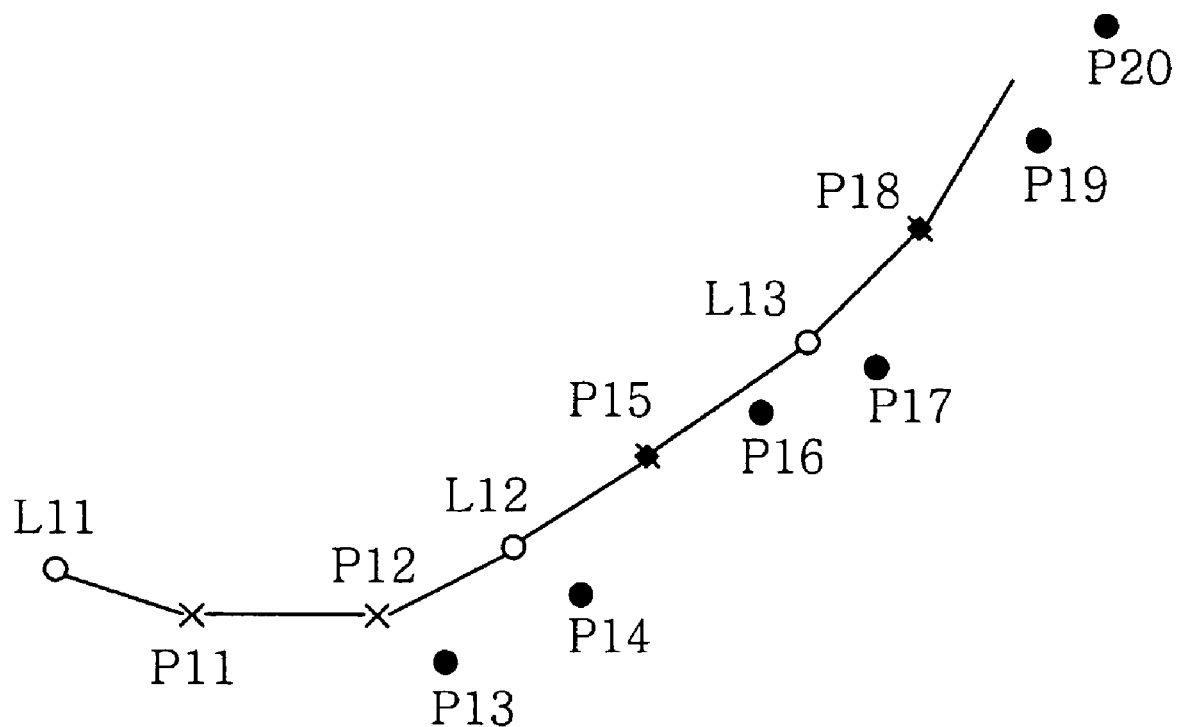
FIG. 5 is a diagram showing a trajectory of current vehicle locations detected according to the detection apparatus and method of the present invention.

In the present invention, assuming that the vehicle travels along links between nodes L11, L12 and L13 as shown in FIG. 5, vehicle locations P11 and P12 are precisely detected using navigation messages with the values of DOP of navigation messages received by the GPS receiver 204 less than a predetermined threshold, and a current vehicle location is detected using detection signals from sensor unit 210 after the values of DOP of navigation messages received by the GPS receiver 204 become equal to or greater than the threshold, the detection signals from the sensor unit 210 are continuously accumulated after the detection of location P12 and vehicle locations P13, P14, P15 . . . are then detected using the cumulative detection signal from the sensor unit 210 based on location P12. Thus, errors produced in detected respective locations P13, P14, P15 . . . are not accumulated on the next detected location, resulting in precise detection of a current vehicle location.

Figure 6:
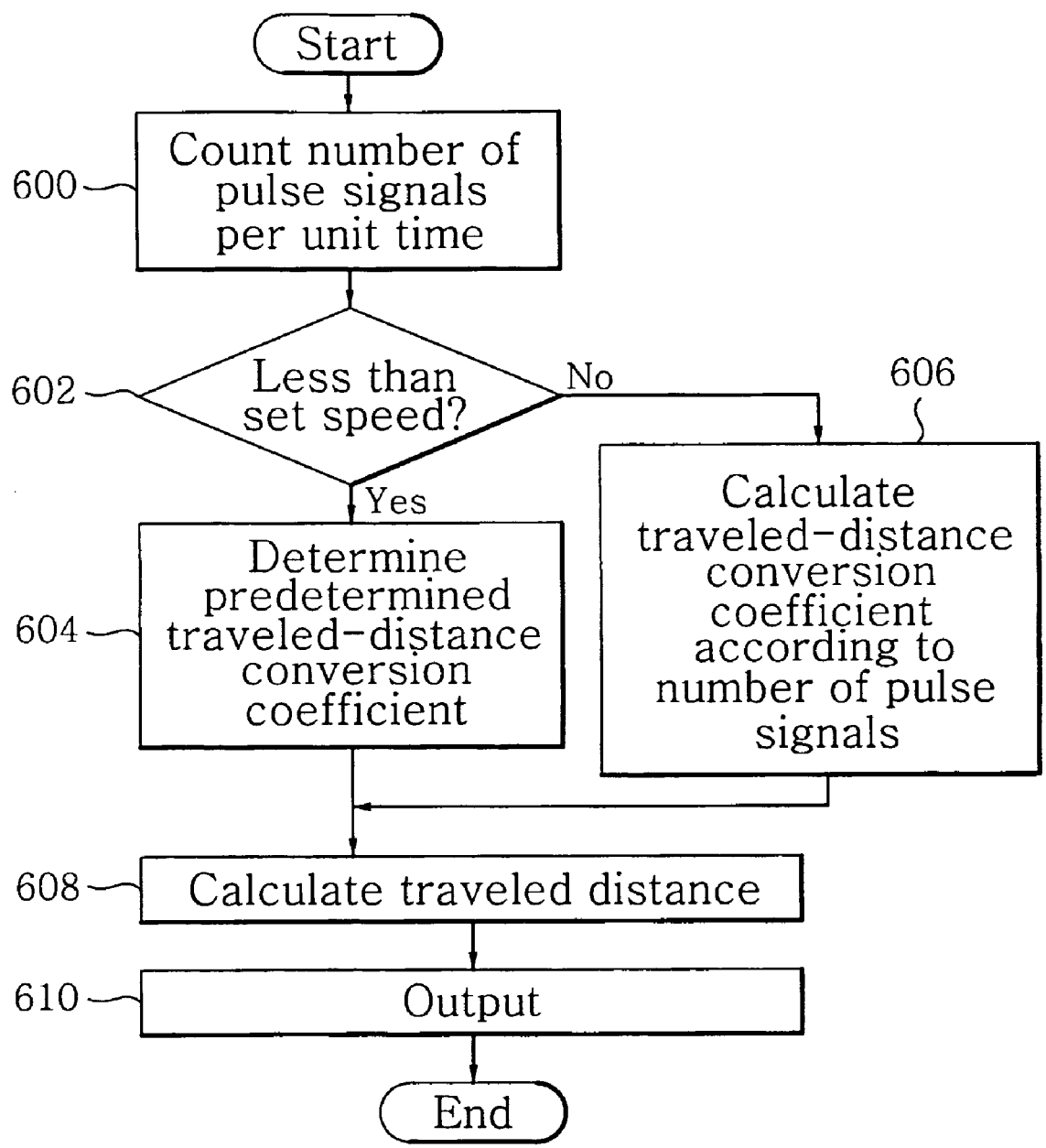
FIG. 6 is a flowchart illustrating an embodiment in which a vehicle location is determined according to a travel speed of a vehicle in the detection method of the present invention.

FIG. 6 is a flowchart illustrating an embodiment in which a traveled distance is differently determined according to the travel speed of a vehicle upon determination of a vehicle location using the detection signals from the sensor unit 210. As shown in the figure, the travel information extraction section 304 of the control unit 212 counts the number of pulse signals per unit time, which are generated by an odometer of the sensor unit 212 according to travel of the vehicle, for example, at a time interval of 1 sec (step 600). In step 602, determination is made as to whether the travel speed of the vehicle is less than a predetermined speed, e.g., 20 km/h, using the number of pulse signals counted.

If it is determined in step 602 that the travel speed of the vehicle is less than the predetermined speed, the travel information extraction section 304 determines a predetermined constant as a traveled-distance conversion coefficient (step 604). If it is determined in step 602 that the vehicle does not travel at a speed less than the predetermined speed, the travel information extraction section 304 calculates a traveled-distance conversion coefficient according to the number of pulse signals per unit time, for example, using formula 1 as follows (step 606):

Traveled–distance conversion coefficient=a+log (number of pulse signals per unit time)/b     (1)

where a and b are empirical constants.

When the traveled-distance conversion coefficient according to the travel speed of the vehicle is determined in such a manner, the travel information extraction section 304 calculates a traveled distance per unit time of the vehicle, for example, from formula 2 using the determined traveled-distance conversion coefficient as follows (step 608):

Traveled distance per unit time=(number of pulse signals per unit time)×(traveled–distance conversion coefficient). (2)

When the traveled distance per unit time of the vehicle is calculated in such a manner, the traveled distance per unit time calculated is output to the dead reckoning section 308 to be used for estimating a vehicle location (step 610).

Tests for determining vehicle locations were performed while the speed of a vehicle was changed to 20 km/h, 40 km/h and 60 km/h, respectively, by applying traveled distances of the vehicle, which were calculated by means of the method of the present invention and a conventional method, to the vehicle.

Figure 7:
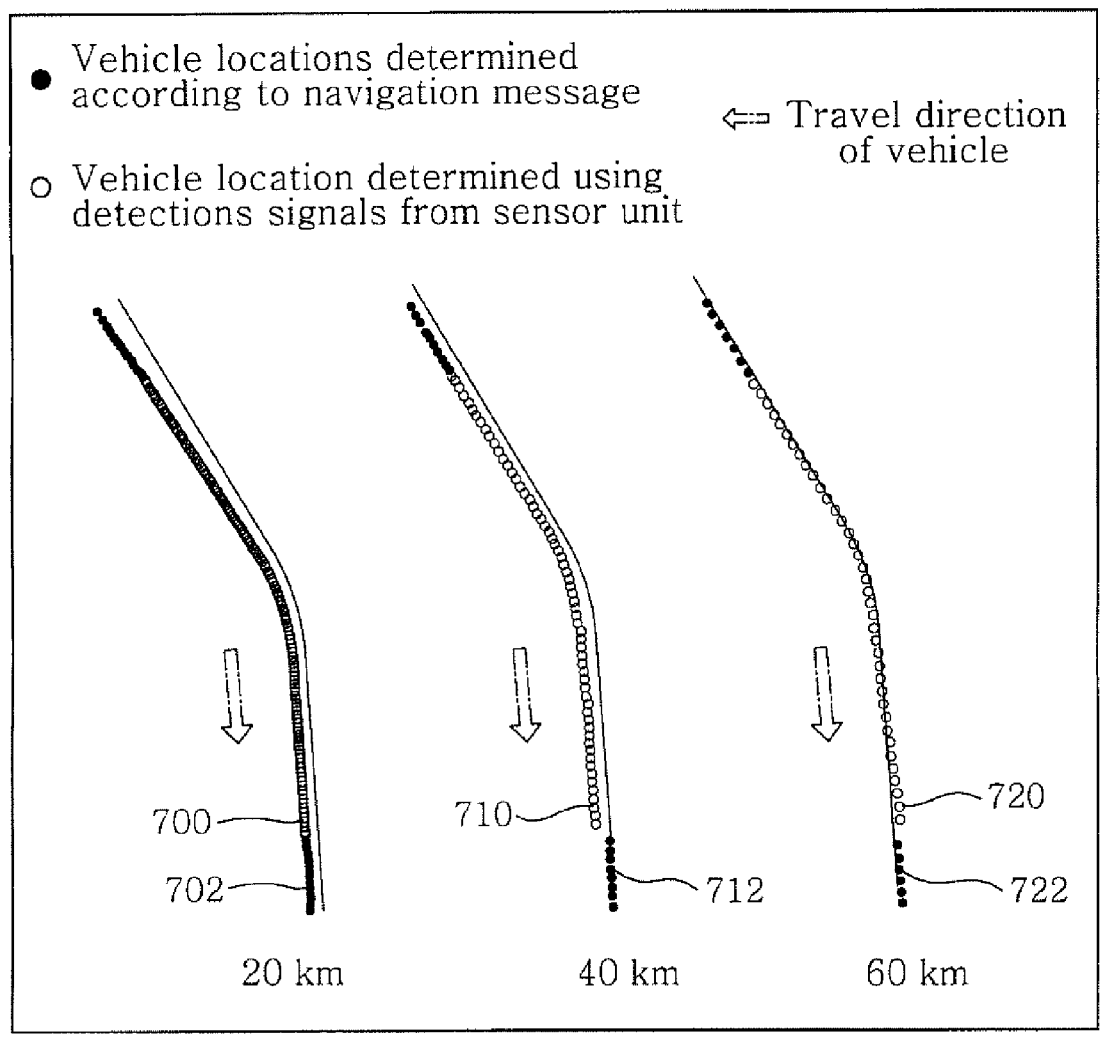
FIGS. 7 and 8 are diagrams showing results displayed by calculating a traveled distance of a vehicle, estimating a vehicle location, and map-matching the vehicle location on a digital map-in accordance with a conventional detection method and the detection method of the present invention, respectively.

FIG. 7 is a diagram showing a displayed state obtained through estimation of vehicle locations and map-matching thereof on a digital map by applying the traveled distances of the vehicle calculated by means of the conventional method while the speed of the vehicle was changed to 20 km/h, 40 km/h and 60 km/h, respectively. As shown in the figure, when the vehicle travels at a speed of 20 km/h, the conventional method of estimating a vehicle location by setting a predetermined constant as the traveled-distance conversion coefficient irrespective of the travel speed of the vehicle hardly has an error between a final vehicle location 700 estimated using the output signals from the sensor unit 210 and an initial vehicle location 702 determined according to a received navigation message due to the value of DOP less than a predetermined threshold, thereby relatively precisely estimating a vehicle location, map-matching the estimated vehicle location on the digital map, and displaying the map-matched results.

However, when the vehicle travels at a speed of 40 km/h, there is a little error between a final vehicle location 710 estimated using the output signals from the sensor unit 210 and an initial vehicle location 712 determined according to a received navigation message due to the value of DOP less than the predetermined threshold. When the vehicle travels at a speed of 60 km/h, it can be seen that there is a large error between a final vehicle location 720 estimated using the output signals from the sensor unit 210 and an initial vehicle location 722 determined according to a received navigation message due to the value of DOP less than the predetermined threshold.

Figure 8:
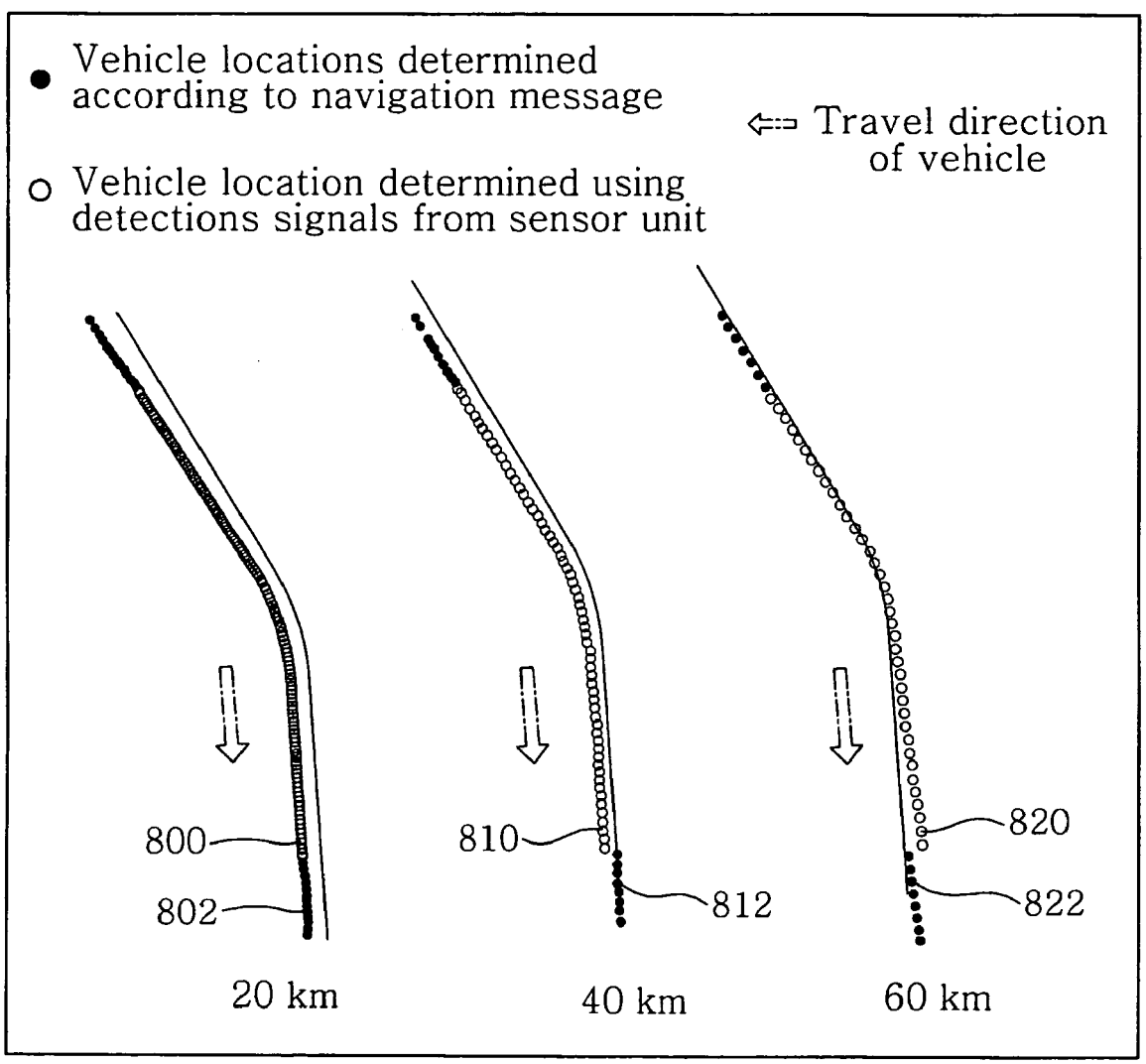

FIG. 8 is a diagram showing a displayed state obtained through estimation of vehicle locations and map-matching thereof on a digital map by applying the traveled distances of the vehicle calculated by means of the method of the present invention while the speed of the vehicle was changed to 20 km/h, 40 km/h and 60 km/h, respectively. As shown in the figure, when the vehicle travels at a speed of 20 km/h, the method of estimating a traveled distance of the vehicle by setting a predetermined constant as a traveled-distance conversion coefficient according to the present invention hardly has an error between a final vehicle location 800 estimated using the output signals from the sensor unit 210 and an initial vehicle location 810 determined according to a received navigation message due to the value of DOP less than a predetermined threshold, thereby precisely estimating a vehicle location, map-matching the estimated vehicle location on the digital map, and displaying the map-matched results.

When the vehicle travels at speeds of 40 km/h and 60 km/h, respectively, the method of calculating a traveled-distance conversion coefficient from aforementioned formula 1 and estimating the traveled distance of the vehicle using the calculated traveled-distance conversion coefficient according to the present invention hardly has an error between final vehicle locations 810 and 820 estimated using the output signals from the sensor unit 210 and initial vehicle locations 812 and 822 determined according to received navigation messages due to the values of DOP less than a predetermined threshold. Therefore, it can be seen that the vehicle location is determined to substantially conform to an actual vehicle location.

Figure 9:
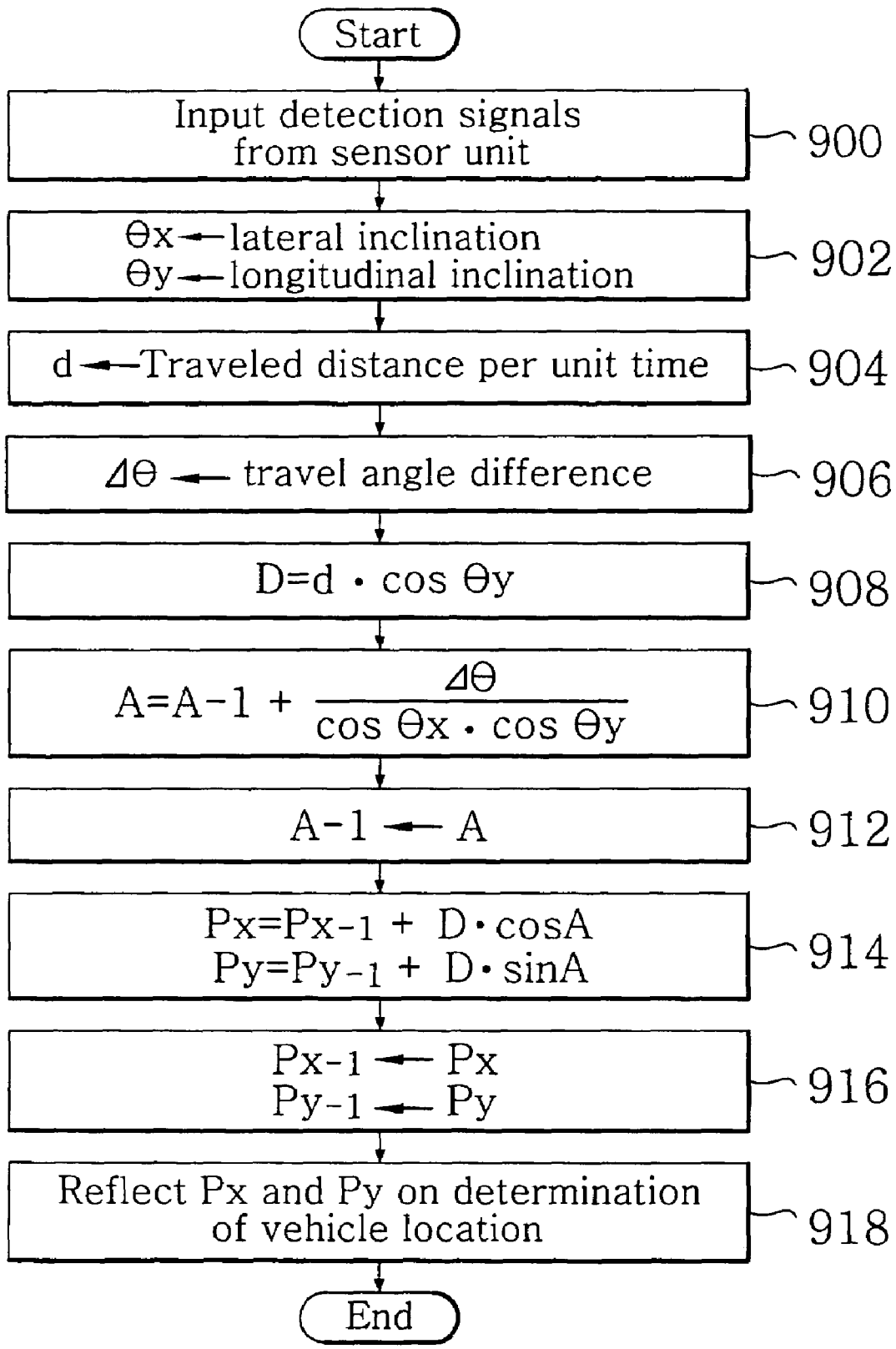
FIG. 9 is a flowchart showing an embodiment in which a vehicle location is determined according to lateral and longitudinal inclinations of a road in the detection method of the present invention.

FIG. 9 is a flowchart illustrating an embodiment in which a vehicle location is determined according to lateral and longitudinal inclinations of a road. As shown in the figure, the dead reckoning section 308 receives vehicle travel information extracted by the travel information extraction section 304 (step 900). A lateral inclination $\theta_x$ of a road on which a vehicle travels and a longitudinal inclination $\theta_y$ of the road are determined using the received travel information (step 902). A traveled distance d per unit time of the vehicle is determined in step 904, and a travel angle difference $\Delta\theta$ of the vehicle is determined in step 906.

Then, a corrected traveled distance D per unit time of the vehicle on a digital map is calculated from formula 3 using the longitudinal inclination $\theta_y$ and the traveled distance d per unit time as follows (step 908):

$$D = d \times \cos \theta_y.$$ (3)

A current travel angle A of the vehicle is calculated from formula 4 using a travel angle $A_{-1}$ of the vehicle previously detected, the determined current travel angle difference $\Delta\theta$ of the vehicle, and the lateral and longitudinal inclinations $\theta_x$ and $\theta_y$ of the road as follows (step 910):

$$A = A_{-1} + \Delta\theta / \cos \theta_x \times \cos \theta_y$$ (4)

When the current travel angle A of the vehicle is calculated, the calculated travel angle A substitutes for the previous travel angle $A_{-1}$ (step 912). Longitude and latitude coordinates $P_x$ and $P_y$ according to travel of the vehicle are calculated from formula 5 as follows (step 914):

$$P_x = P_{x-1} + D \times \cos A$$

$$P_y = P_{y-1} + D \times \sin A$$ (5)

When the longitude and latitude coordinates $P_x$ and $P_y$ according to travel of the vehicle are calculated in step 914, the longitude and latitude coordinates $P_x$ and $P_y$ substitute for previous longitude and latitude coordinates $P_{x-1}$ and $P_{y-1}$ so that they can be used for the next determination of a vehicle location (step 916). A vehicle location is determined by reflecting the longitude and latitude coordinates $P_x$ and $P_y$ on the determination of the vehicle location (step 908).

A principle for correcting a travel angle of a vehicle using lateral and longitudinal axes when the vehicle travels on a laterally inclined curvilinear road, and a principle for correcting a traveled distance of the vehicle using an inclination when the vehicle travels on a longitudinally inclined linear road in accordance with the present invention will be described in greater detail below.

Figure 10A:
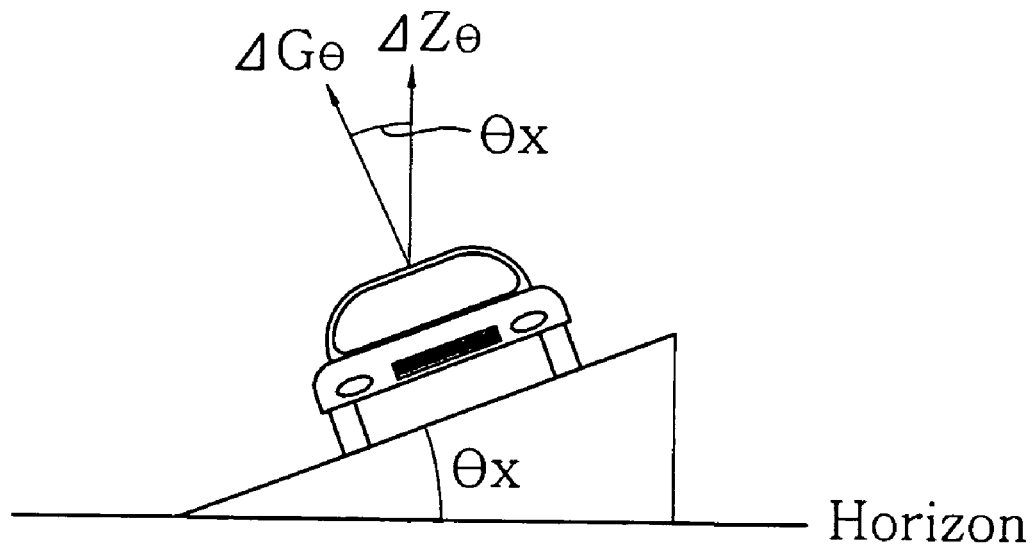
FIG. 10a is a diagram illustrating a principle for correcting a travel angle difference of a vehicle in the detection method of the present invention in a case where the vehicle travels on a curvilinear road with a lateral inclination.

FIG. 10a is a diagram illustrating a principle for correcting a turn angle in the method of determining a vehicle location according to the present invention when a vehicle turns on a laterally inclined curvilinear road with a lateral inclination of $\theta_x$. As shown in the figure, since a biaxial inclinometer of the sensor unit 210 is installed on the vehicle to detect lateral and longitudinal inclinations of a road on which the vehicle travels, a travel angle difference of the vehicle detected by a gyroscope on a laterally inclined road is $\Delta\theta$. When the detected travel angle difference $\Delta\theta$ of the vehicle is converted into an angular rate based on a vertical axis (Z-axis), it is possible to precisely obtain a travel angle of the vehicle on a digital map.

In FIG. 10a, since an orientation angle difference $\Delta G_\theta$ of the vehicle is $\Delta Z_\theta \times \cos\theta_x$, a travel angle difference $\Delta Z_\theta$ of the vehicle becomes $\Delta G_\theta/\cos\theta_x$. The previously detected travel angle A−1 of the vehicle is added to the travel angle difference $\Delta Z_\theta$ of the vehicle ($\Delta Z_\theta = \Delta G_\theta/\cos\theta_x$) to calculate the current travel angle A of the vehicle (step 910).

Figure 10B:
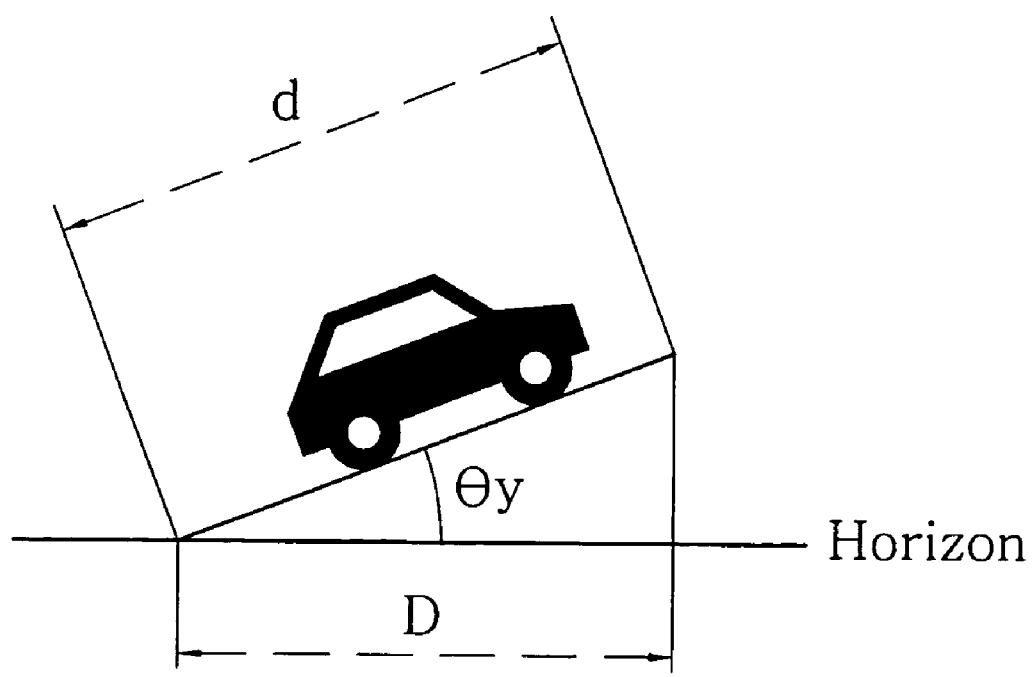
FIG. 10b is a diagram illustrating a principle for correcting a traveled distance of a vehicle in the detection method of the present invention in a case where the vehicle travels on a straight road with a longitudinal inclination.

FIG. 10b is a diagram illustrating a principle for correcting a traveled distance of a vehicle in the method of the present invention when the vehicle travels on a longitudinally inclined linear road with a longitudinal inclination of $\theta_y$. As shown in the figure, when the vehicle travels on an inclined linear road, a traveled distance D on a digital map is shorter than an actual traveled distance d of the vehicle.

Therefore, if the traveled distance on the digital map is not corrected with respect to the traveled distance of the vehicle according to the inclination of the road when the vehicle travels on the inclined linear road, an error occurs in proportion to the inclination of the road, resulting in incorrect determination of a vehicle location.

Thus, when the vehicle travels on the inclined linear road, the traveled distance D of the vehicle is corrected using formula 6 in the present invention as follows:

$$D = d \times \cos\theta_y. \quad (6)$$

At this time, if a longitudinal inclination of the vehicle is $\theta_y$, the traveled distance D of the vehicle is corrected with $d \times \cos\theta_y$ in the same manner as step 908.

Vehicle locations were determined in the following by employing the method of the present invention and a conventional method when a vehicle travels on an inclined curvilinear road.

Figure 11A:
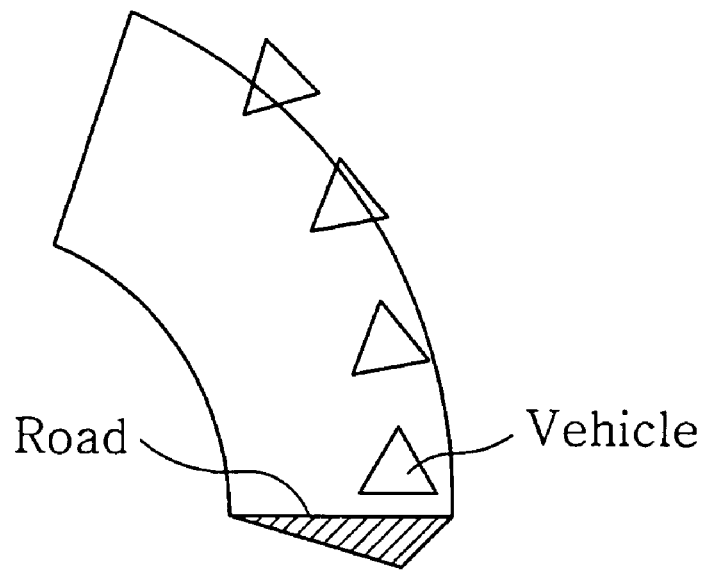
FIGS. 11a and 11b are diagrams showing vehicle locations on a curvilinear road with a lateral inclination, which are determined according to a conventional detection method and the detection method of the present invention, respectively.
Figure 11B:
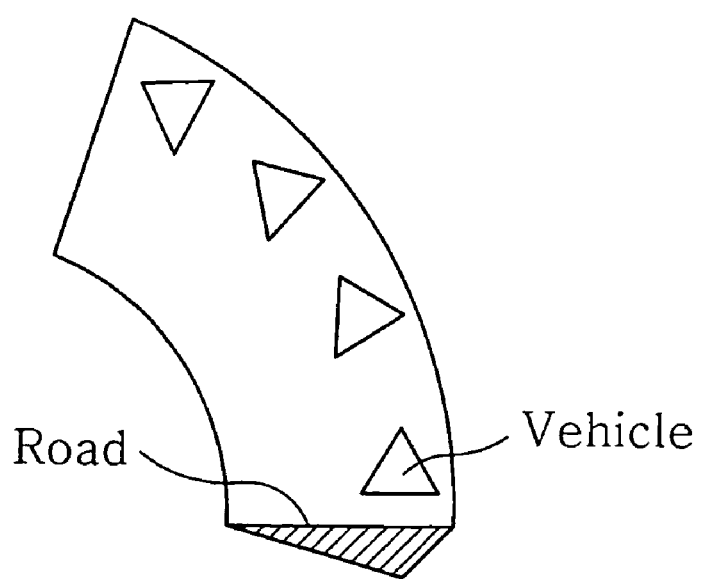

In the conventional method of determining a vehicle location using only detection signals from a gyroscope and an odometer installed on the vehicle, there was an error by which the vehicle was determined as traveling on a location deviating from the road as shown in FIG. 11a. However, according to the present invention, a vehicle location is determined by correcting the detection signals from the gyroscope using lateral inclination of the road. Therefore, as shown in FIG. 11b, the vehicle was precisely determined as normally traveling along the road.

Figure 12:
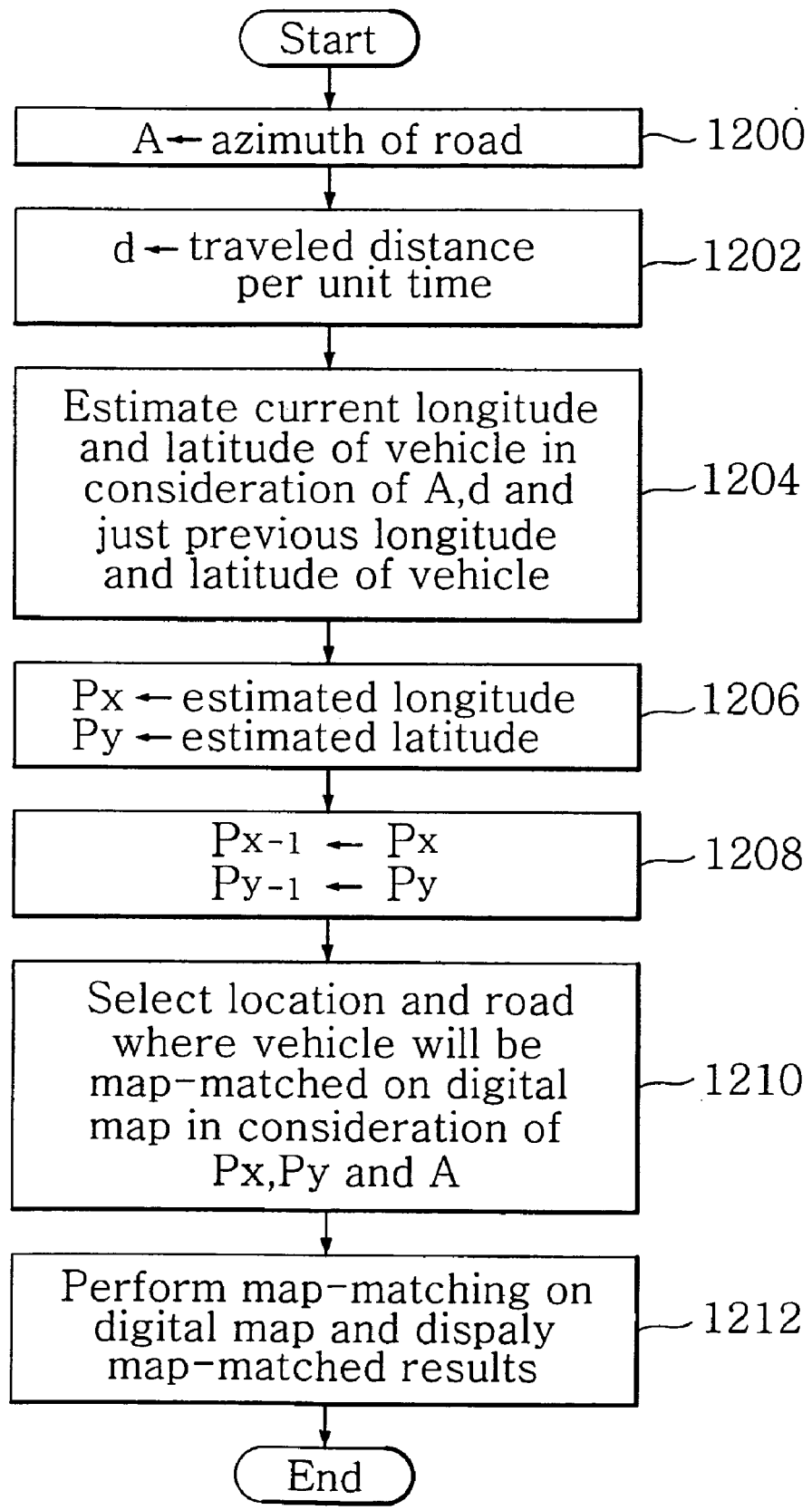
FIG. 12 is a flowchart illustrating an embodiment in which a vehicle location is detected using information on the azimuth of a road in the detection method of the present invention.

FIG. 12 is a flowchart illustrating an embodiment in which a vehicle location is detected using azimuth information on a road in the detection method of the present invention. As shown in the figure, the control unit 212 extracts an azimuth of a road with a just previous vehicle location matched thereto from a digital map data and stores the extracted azimuth as variable A (step 1200). A traveled distance per unit time of the vehicle is detected by using a detection signal from the odometer, i.e. by multiplying the number of pulse signals generated by the odometer upon travel of the vehicle by the aforementioned traveled-distance conversion coefficient, and then stored as variable d (step 1202). At this time, the traveled-distance conversion coefficient is differently set according to a travel speed of the vehicle as described above.

Then, current longitude and latitude coordinates of the traveling vehicle are estimated in consideration of the azimuth A of the road, the traveled distance d per unit time of the vehicle, and longitude and latitude coordinates of the vehicle just previously detected (step 1204). The estimated longitude and latitude coordinates are stored as variables $P_x$ and $P_y$, respectively (step 1206).

When the current longitude and latitude coordinates of the vehicle and the azimuth of the road on which the vehicle travels are extracted in such a manner, the control unit 212 stores the longitude and latitude coordinates of the vehicle, which have been stored as variables $P_x$ and $P_y$, as variables $P_{x-1}$ and $P_{y-1}$ so that they can be used for the next detection of a vehicle location (step 1208).

Then, a location and a road where the vehicle will be matched on a digital map are selected in consideration of the extracted longitude and latitude coordinates of the vehicle and the azimuth of the road (step 1210). The vehicle is matched to the selected location and road on the digital map and the matched results are displayed on the screen of the display unit 214 (step 1212).

Figure 13A:
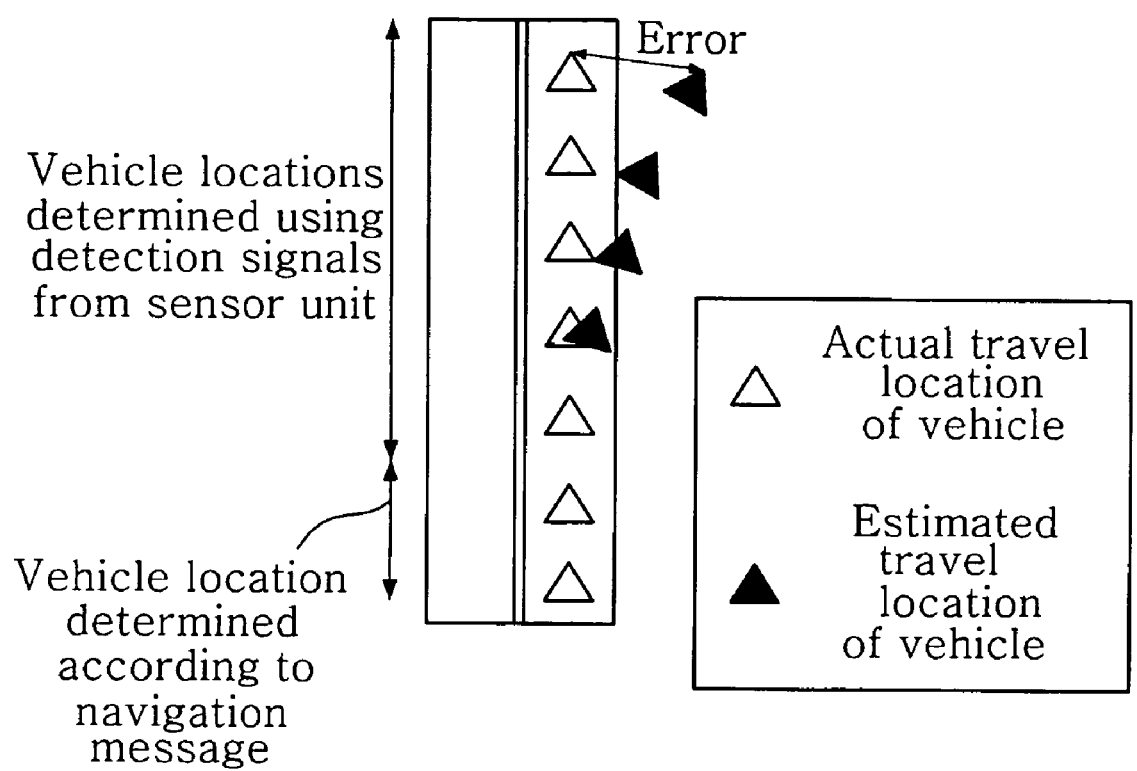
FIGS. 13a and 13b are diagrams showing vehicle locations detected according to a conventional detection method and the detection method of the present invention, respectively.

FIG. 13a is a view showing results of estimation of a vehicle location according to a conventional method in which an azimuth of a road is not reflected on the estimation of the vehicle location using the detection signals from the sensor unit 210 since the value of DOP of a navigation message received by the GPS receiver 204 is greater than a predetermined threshold. As shown in the figure, it can be seen that in the conventional method, the estimation of the vehicle location using the detection signals from the sensor unit 210 results in a cumulative error integrated through integration of output signals of the gyroscope as a vehicle travels and thus errors between actual vehicle locations and estimated vehicle locations are consecutively accumulated.

Figure 13B:
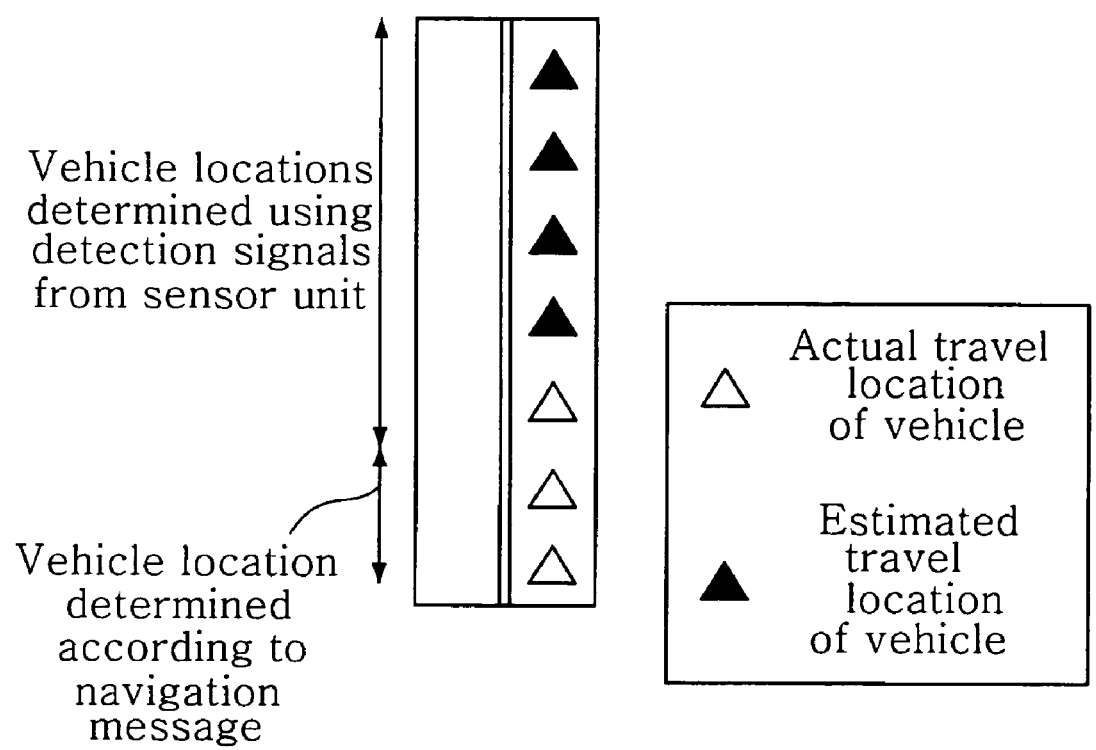

However, according to the present invention in which the azimuth of the road is reflected, it can be seen that an error hardly occurs between actual vehicle locations and estimated vehicle locations since the azimuth of the road on which the vehicle travels is reflected even though the integrated error resulting from the integration of the output signals of the gyroscope during the travel of the vehicle is consecutively accumulated, as shown in FIG. 13b.

Figure 14:
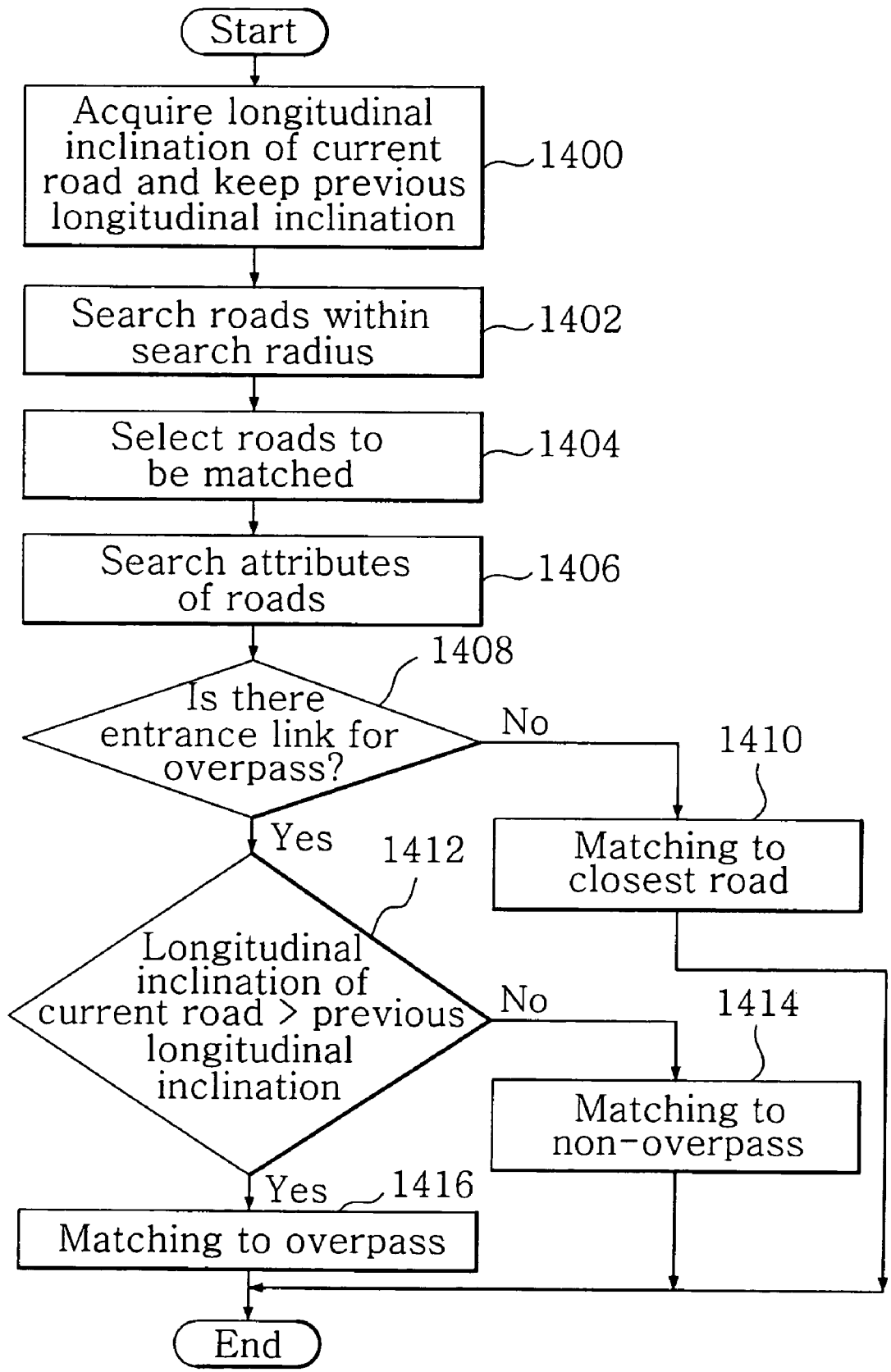
FIG. 14 is a flowchart illustrating an embodiment in which a road on which a vehicle location is matched is determined according to an inclination of a road on which a vehicle travels in the detection method of the present invention.

FIG. 14 is a flowchart illustrating an embodiment in which a road on which a vehicle location is matched is determined according to an inclination of a road on which a vehicle travels in the detection method of the present invention. As shown in the figure, the control unit 212 acquires a longitudinal inclination of a road on which the vehicle travels currently and keeps a longitudinal inclination of a road on which the vehicle has traveled just previously. Then, the control unit 212 searches all roads existing within a predetermined search radius centered on a current vehicle location using digital map data (step 1402).

The control unit 212 extracts roads with high possibilities of matching of the vehicle location thereon among the roads existing within the search radius (step 1404), searches attributes of the extracted roads (step 1406), and determines whether there is an entrance link for an overpass (step 1408).

If it is determined in step 1408 that there is no entrance link for an overpass, one road closest to the current vehicle location is selected from the extracted roads and the current vehicle location is matched on the selected road (step 1410).

If it is determined in step 1408 that there is an entrance link for an overpass, the longitudinal inclination of the road on which the vehicle travels currently is compared with that of the road on which the vehicle has traveled previously (step 1412).

If it is determined in step 1412 that the inclination of the current road is not greater than that of the previous road, a non-overpass closest to the current vehicle location is selected and the current vehicle location is matched on the selected non-overpass (step 1414).

If it is determined in step 1412 that the inclination of the current road is greater than that of the previous road, this state corresponds to a state where the vehicle enters an entrance link for an overpass and thus the control unit 212 matches the vehicle location on the overpass (step 1416).

Generally, at a junction of an overpass and a surface street, it is impossible to precisely determine whether a vehicle location is matched on the overpass or surface street. In such a case, the possibility of matching of the vehicle location on a correct road becomes 50%. If the vehicle location is not matched on a correct road, errors occur in a guidance and search of a path, and the like.

Therefore, in the present invention, the performance of an entire system is improved due to reduction of errors in location estimation and a guidance and search of a path by detecting an inclination of a road at a junction of an overpass and a surface street, selecting the overpass or surface street according to the detected inclination of the road, and precisely matching a vehicle location on the selected road.

According to the present invention described above, vehicle location information just previously map-matched to digital map data is stored at an initial stage where the value of DOP becomes equal to or greater than a predetermined threshold, detection signals from the sensor unit are accumulated, and a current vehicle location is estimated using the stored vehicle location information and the accumulated detection signals from the sensor unit. Accordingly, errors in the vehicle location information estimated using the detection signals from the sensor unit are not accumulated, resulting in precise estimation of a current vehicle location.

Further, a vehicle location can be more precisely estimated by differently setting the traveled-distance conversion coefficient according to a travel speed of the vehicle, and reflecting lateral and longitudinal inclinations and an actual azimuth of a road on which the vehicle travels. By using an inclination of the vehicle at a junction of an overpass and a surface street, the vehicle location can be precisely map-matched on the overpass or surface street.

Although the present invention has been illustrated and described in connection with the preferred embodiments, it will be readily understood by those skilled in the art that various adaptations and changes can be made thereto without departing from the spirit and scope of the present invention defined by the appended claims.

What is claimed is:

1. An apparatus for detecting a vehicle location in a navigation system, comprising:
    a GPS receiver for receiving a navigation message transmitted by a GPS satellite;
    a map data storage unit for storing a digital map data therein;
    a sensor unit for detecting a travel direction and a traveled distance of a vehicle and lateral and longitudinal inclinations of a road on which the vehicle travels;
    a control unit for comparing the value of DOP (Dilution of Precision) of the navigation message received by the GPS receiver with a predetermined threshold, setting reference vehicle location information from vehicle location information detected using the navigation message if the value of DOP is less than the predetermined threshold, or determining the reference vehicle location information by storing vehicle location information map-matched to the digital map data when the just previous value of DOP was less than the predetermined threshold, by accumulating detection signals from the sensor unit, and by using the stored vehicle location information and the accumulated detection signals from the sensor unit if the value of DOP is equal to or greater than the predetermined threshold, estimating the vehicle location using the determined reference vehicle location information and the detection signals from the sensor unit, and map-matching the estimated vehicle location to the digital map data stored in the map data storage unit; and
    a display unit for displaying the digital map data and vehicle location map-matched by the control unit on a screen thereof.

2. The apparatus as claimed in claim 1, wherein the control unit comprises:
    a map-matched result extraction section for extracting the vehicle location information on results of the map-matching of the vehicle location to the digital map data, and extracting a status code for notifying whether the extracted vehicle location information is location information determined using the navigation message;
    a location information extraction section for extracting the vehicle location information and the DOP (Dilution of Precision) using the navigation message received by the GPS receiver;
    a travel information extraction section for extracting vehicle travel information using the detection signals from the sensor unit;
    a reference location information determination section for determining the reference vehicle location information using the vehicle location information extracted by the location information extraction section if the value of DOP extracted by the location information extraction section is less than the predetermined threshold, or determining the reference vehicle location information by storing the vehicle location information extracted by the map-matched result extraction section when the just previous value of DOP was less than the predetermined threshold, by accumulating the detection signals from the sensor unit, and by using the stored vehicle location information and the accumulated detection signals from the sensor unit if the extracted value of DOP is equal to or greater than the predetermined threshold, and for generating a status code for notifying whether the determined reference vehicle location information is location information determined using the navigation message;
    a dead reckoning section for detecting current vehicle location information by performing dead-reckoning using the reference vehicle location information determined by the reference location information determination section and the vehicle travel information extracted by the travel information extraction section; and
    a map-matching section for map-matching the vehicle location information detected by the dead reckoning section to the digital map data stored in the map data storage unit, outputting the map-matched results to the display unit, and providing information on the map-matched results to the map-matched result extraction section to extract the vehicle location information according to the map-matching.

3. The apparatus as claimed in claim 2, wherein the travel information extracted by the travel information extraction section includes a travel angle difference, a traveled distance, and lateral and longitudinal inclinations of the vehicle.

4. A method for detecting a vehicle location in a navigation system, comprising the steps of:
   extracting, by a map-matched result extraction section, vehicle location information by receiving vehicle location information map-matched to digital map data from a map-matching section, extracting, by a location information extraction section, vehicle location information and DOP (Dilution of Precision) using a navigation message received by a GPS receiver, and extracting, by a travel information extraction section, vehicle travel information using detection signals from a sensor unit installed on a vehicle;
   determining the vehicle location information extracted by the location information extraction section as reference vehicle location information, or determining the reference vehicle location information by storing the vehicle location information extracted by the map-matched result extraction section, accumulating the detection signals from the sensor unit, and using the stored vehicle location information and the accumulated detection signals from the sensor unit, according to the extracted value of DOP;
   performing, by a dead reckoning section, dead reckoning using the vehicle travel information extracted by the travel information extraction section and the determined reference vehicle location information to extract current vehicle location information; and
   map-matching, by the map-matching section, the current vehicle location information extracted by the dead reckoning section to the digital map data, displaying the map-matched results on a display unit, and providing the map-matched results to the map-matched result extraction section to extract the map-matched vehicle location information.

5. The method as claimed in claim 4, wherein the step of determining the reference vehicle location information comprises the steps of:
   comparing the value of DOP (Dilution of Precision) with a predetermined threshold;
   if it is determined from the comparison that the value of DOP is less than the predetermined threshold, determining the vehicle location information extracted by the location information extraction section as the reference vehicle location information; and
   if it is determined from the comparison that the value of DOP is equal to or greater than the predetermined threshold, storing the vehicle location information extracted by the map-matched result extraction section when the just previous value of DOP was less than the predetermined threshold, accumulating the detection signals from the sensor unit, and determining the reference vehicle location information using the stored vehicle location information and the accumulated detection signals from the sensor unit.

6. The method as claimed in claim 4, wherein the travel information extracted by the travel information extraction section includes a travel angle difference, a traveled distance, and lateral and longitudinal inclinations of the vehicle.

7. The method as claimed in claim 6, wherein the extraction of a traveled distance from the vehicle travel information is performed by the steps of determining a travel speed of the vehicle using the number of pulse signals per unit time generated by an odometer of the sensor unit according to travel of the vehicle, determining a traveled-distance conversion coefficient varying according to the determined travel speed, and calculating a traveled distance per unit time of the vehicle.

8. The method as claimed in claim 7, wherein the step of determining the traveled-distance conversion coefficient comprises the steps of:
   determining whether the travel speed of the vehicle is equal to or greater than a predetermined speed;
   if it is determined that the travel speed of the vehicle is not equal to or greater than the predetermined speed, determining a predetermined constant as the traveled-distance conversion coefficient; and
   if it is determined that the travel speed of the vehicle is equal to or greater than the predetermined speed, determining the traveled-distance conversion coefficient through calculation using a predetermined logarithmic function including the number of pulse signals per unit time generated by the odometer.

9. The method as claimed in claim 8, wherein the traveled-distance conversion coefficient is calculated using formula (1) as follows:

$$\text{Traveled-distance conversion coefficient} = a + \log(\text{number of pulse signals per unit time})/b$$

where a and b are empirical constants.

10. The method as claimed in claim 7, wherein the traveled distance per unit time of the vehicle is calculated by multiplying the number of pulse signals per unit time generated by the odometer by the traveled-distance conversion coefficient.

11. The method as claimed in claim 6, wherein the extraction of the current vehicle location information is performed by the steps of:
   receiving a travel angle difference and the traveled distance of the vehicle, and lateral and longitudinal inclinations of a road on which the vehicle travels from the sensor unit;
   calculating a traveled distance per unit time using the received traveled distance;
   correcting the travel angle of the vehicle using the received travel angle difference and the received lateral and longitudinal inclinations;
   correcting the traveled distance per unit time using the received lateral and longitudinal inclinations; and
   determining a current vehicle location from a previous vehicle location using the corrected travel angle and the corrected traveled distance per unit time.

12. The method as claimed in claim 11, wherein the travel angle of the vehicle is corrected using formula (4) as follows:

$$A = A_{-1} + \Delta\theta / \cos\theta_x \times \cos\theta_y$$

where A is a corrected current travel angle of the vehicle, A−1 is a previous travel angle, $\Delta\theta$ is a travel angle difference of the vehicle detected by the sensor unit, and $\theta x$ and $\theta y$ are lateral and longitudinal inclinations of the road on which the vehicle travels.

13. The method as claimed in claim 11, wherein the traveled distance per unit time is corrected using formula (3) as follows:

$$D = d \times \cos\theta_y$$

where D is a corrected traveled distance per unit time of the vehicle, d is the traveled distance per unit time, and $\theta y$ is a longitudinal inclination of the road on which the vehicle travels.

14. The method as claimed in claim 11, wherein the current vehicle location is determined using formula (5) as follows:

$$P_x = P_{x-1} + D \times \cos A$$

$$P_y = P_{y-1} + D \times \sin A$$

where Px and Py are corrected current longitude and latitude coordinates of the vehicle, Px−1 and Py−1 are longitude and latitude coordinates of the vehicle detected prior to the unit time, D is a corrected traveled distance per unit time of the vehicle, and A is a corrected travel angle of the vehicle.

15. The method as claimed in claim 4, wherein the extraction of the current vehicle location information is performed by the steps of:
   extracting an azimuth of a road on which the vehicle travels from the digital map data, and calculating a traveled distance per unit time of the vehicle;
   estimating current longitude and latitude coordinates of the vehicle using the azimuth of the road, the traveled distance per unit time of the vehicle, and just previously estimated longitude and latitude coordinates of the vehicle;
   selecting a location and a road where the vehicle will be matched on a digital map using the extracted azimuth of the road and the estimated longitude and latitude coordinates of the vehicle; and
   matching the vehicle at the selected location and road and displaying the matched results.

16. The method as claimed in claim 15, wherein the calculation of the traveled distance per unit time of the vehicle is performed by the steps of determining a travel speed of the vehicle using the number of pulse signals per unit time generated by an odometer of the sensor unit according to the travel of the vehicle, determining a traveled-distance conversion coefficient varying according to the determined travel speed, and calculating the traveled distance per unit time.

17. The method as claimed in claim 16, wherein the step of determining the traveled-distance conversion coefficient comprises the steps of:
   determining whether the travel speed of the vehicle is equal to or greater than a predetermined speed;
   if it is determined that the travel speed of the vehicle is not equal to or greater than the predetermined speed, determining a predetermined constant as the traveled-distance conversion coefficient; and
   if it is determined that the travel speed of the vehicle is equal to or greater than the predetermined speed, determining the traveled-distance conversion coefficient through calculation using a predetermined logarithmic function including the number of pulse signals per unit time generated by the odometer.

18. The method as claimed in claim 17, wherein the traveled-distance conversion coefficient is calculated using formula (1) as follows:

Traveled−distance conversion coefficient=a+log (number of pulse signals per unit time)/b where a and b are empirical constants.

19. The method as claimed in claim 16, wherein the step of calculating the traveled distance per unit time of the vehicle comprises the step of making correction using formula (3) as follows:

$$D = d \times \cos \theta_y$$

where D is a corrected traveled distance per unit time of the vehicle, d is the traveled distance per unit time, and θy is a longitudinal inclination of the road on which the vehicle travels.

20. The method as claimed in claim 15, wherein the step of selecting the location and the road where the vehicle will be matched comprises the steps of:
   acquiring an inclination of the road on which the vehicle travels using the detection signals from the sensor unit;
   searching roads within a search radius set with respect to a current vehicle location, extracting roads on which the vehicle location will be matched, and searching attributes of the extracted roads;
   if it is determined from the search results of the road attributes that there is no entrance link for an overpass, the current vehicle location is matched on a road closest thereto;
   if it is determined from the search results of the road attributes that there is an entrance link for an overpass, comparing the acquired inclination of the road on which the vehicle currently travels with an inclination of a road on which the vehicle has traveled previously;
   if it is determined from the comparison that the inclination of the current road is larger than that of the previous road, matching the vehicle location on an overpass; and
   if it is determined from the comparison that the inclination of the current road is not larger than that of the previous road, matching the vehicle location on a closest road among roads except overpasses.

21. A method for determining a vehicle location, comprising the steps of:
   determining a travel speed of a vehicle using the number of pulse signals per unit time generated by an odometer of a sensor unit according to travel of the vehicle;
   setting a traveled-distance conversion coefficient varying according to the determined travel speed of the vehicle, and calculating a traveled distance per unit time of the vehicle; and
   determining the vehicle location by performing dead reckoning using the calculated traveled distance per unit time.

22. The method as claimed in claim 21, wherein the step of calculating the traveled distance per unit time comprises the steps of:
   if it is determined that the travel speed of the vehicle is not equal to or greater than a predetermined speed, determining a predetermined constant as the traveled-distance conversion coefficient;
   if it is determined that the travel speed of the vehicle is equal to or greater than the predetermined speed, determining the traveled-distance conversion coefficient through calculation using a predetermined logarithmic function including the number of pulse signals per unit time generated by the odometer; and
   calculating the traveled distance per unit time of the vehicle using the determined traveled-distance conversion coefficient.

23. The method as claimed in claim 21, wherein the traveled-distance conversion coefficient is calculated using formula (1) as follows:

Traveled−distance conversion coefficient=a+log (number of pulse signals per unit time)/b where a and b are empirical constants.

24. The method as claimed in claim 20, wherein the traveled distance per unit time of the vehicle is calculated by multiplying the number of pulse signals per unit time generated by the odometer by the traveled-distance conversion coefficient.

25. The method as claimed in claim 20, wherein the step of calculating the traveled distance per unit time of the vehicle comprises the step of making correction using formula (3) as follows:

$$D = d \times \cos \theta_y$$

where D is a corrected traveled distance per unit time of the vehicle, d is the traveled distance per unit time, and θy is a longitudinal inclination of the road on which the vehicle travels.

26. A method of detecting a vehicle location in a navigation system, comprising the steps of:

receiving, by a control unit, a travel angle difference and a traveled distance of a vehicle, and lateral and longitudinal inclinations of a road on which the vehicle travels from a sensor unit;

calculating a traveled distance per unit time using the received traveled distance;

correcting a travel angle of the vehicle using the received lateral and longitudinal inclinations of the road;

correcting the traveled distance per unit time using the received lateral and longitudinal inclinations of the road; and detecting a current vehicle location from a previous vehicle location using the corrected travel angle and the corrected traveled distance per unit time.

27. The method as claimed in claim 26, wherein the travel angle of the vehicle is corrected using formula (4) as follows:

$$A = A_{-1} + \Delta\theta / \cos \theta_x \times \cos \theta_y$$

where A is a corrected current travel angle of the vehicle, A−1 is a previous travel angle, Δθ is a travel angle difference of the vehicle detected by the sensor unit, and θx and θy are lateral and longitudinal inclinations of the road on which the vehicle travels.

28. The method as claimed in claim 26, wherein the traveled distance per unit time of the vehicle is corrected using formula (3) as follows:

$$i\ D = d \times \cos \theta_y$$

where D is a corrected traveled distance per unit time of the vehicle, d is the traveled distance per unit time, and θy is a longitudinal inclination of the road on which the vehicle travels.

29. The method as claimed in claim 26, wherein the current vehicle location is detected using formula (5) as follows:

$$P_x = P_{x-1} + D \times \cos A$$

$$P_y = P_{y-1} + D \times \sin A$$

where Px and Py are corrected current longitude and latitude coordinates of the vehicle, Px−1 and Py−1 are longitude and latitude coordinates of the vehicle detected prior to the unit time, D is a corrected traveled distance per unit time of the vehicle, and A is a corrected travel angle of the vehicle.

30. A method for detecting a vehicle location in a navigation system, comprising the steps of:

extracting, by a control unit, an azimuth of a road on which a vehicle currently travels from a digital map data, and extracting a traveled distance per unit time of the vehicle using the number of pulse signals output from an odometer of a sensor unit according to travel of the vehicle;

estimating current longitude and latitude coordinates of the vehicle using the extracted azimuth of the road, the extracted traveled distance per unit time of the vehicle, and just previously estimated longitude and latitude coordinates of the vehicle;

determining a location and a road where the vehicle will be matched on the digital map using the extracted azimuth of the road and the estimated longitude and latitude coordinates of the vehicle; and matching the vehicle at the determined location and road and displaying the matched results.

31. A method for detecting a vehicle location in a navigation system, comprising the steps of:

acquiring, by a control unit, a current vehicle location using hybrid navigation;

acquiring an inclination of a road on which a vehicle travels using detection signals from a sensor unit;

searching roads within a search radius set from the acquired current vehicle location using digital map data, extracting roads on which the vehicle location will be matched, and searching attributes of the extracted roads;

if it is determined from the search results of the road attributes that there is no entrance link for an overpass, the current vehicle location is matched on a road closest thereto;

if it is determined from the search results of the road attributes that there is an entrance link for an overpass, comparing the acquired inclination of the road on which the vehicle currently travels with an inclination of a previous road on which the vehicle has traveled;

if it is determined from the comparison that the inclination of the current road is larger than that of the previous road, matching the vehicle location on an overpass; and if it is determined from the comparison that the inclination of the current road is not larger than that of the previous road, matching the vehicle location on a closest road among roads except overpasses.

* * * * *